(12) United States Patent
Birnbaum et al.

(10) Patent No.: US 10,747,823 B1
(45) Date of Patent: Aug. 18, 2020

(54) INTERACTIVE AND CONVERSATIONAL DATA EXPLORATION

(71) Applicant: Narrative Science Inc., Chicago, IL (US)

(72) Inventors: Lawrence A. Birnbaum, Evanston, IL (US); Kristian J. Hammond, Chicago, IL (US)

(73) Assignee: NARRATIVE SCIENCE INC., Chicago, IL (US)

( * ) Notice: Subject to any disclaimer, the term of this patent is extended or adjusted under 35 U.S.C. 154(b) by 75 days.

(21) Appl. No.: 15/895,800

(22) Filed: Feb. 13, 2018

Related U.S. Application Data

(63) Continuation-in-part of application No. 14/570,834, filed on Dec. 15, 2014, now Pat. No. 9,977,773, which is a continuation of application No. 14/521,264, filed on Oct. 22, 2014, now Pat. No. 9,720,899, application No. 15/895,800, which is a continuation-in-part of application No. 15/666,151, filed on Aug. 1, 2017.

(60) Provisional application No. 62/458,460, filed on Feb. 13, 2017, provisional application No. 62/382,063, filed on Aug. 31, 2016.

(51) Int. Cl.
*G06F 16/95* (2019.01)
*G06N 20/00* (2019.01)
*G06F 16/20* (2019.01)
*G06F 40/253* (2020.01)

(52) U.S. Cl.
CPC .............. *G06F 16/95* (2019.01); *G06F 16/20* (2019.01); *G06F 40/253* (2020.01); *G06N 20/00* (2019.01)

(58) Field of Classification Search
None
See application file for complete search history.

(56) References Cited

U.S. PATENT DOCUMENTS

| | | | |
|---|---|---|---|
| 4,992,939 A | 2/1991 | Tyler | |
| 5,734,916 A | 3/1998 | Greenfield et al. | |
| 5,802,495 A | 9/1998 | Goltra | |
| 6,144,938 A * | 11/2000 | Surace | G10L 13/033 704/257 |
| 6,289,363 B1 | 9/2001 | Consolatti et al. | |

(Continued)

FOREIGN PATENT DOCUMENTS

| | | |
|---|---|---|
| WO | 9630844 A1 | 10/1996 |
| WO | 2006122329 A2 | 11/2006 |

(Continued)

OTHER PUBLICATIONS

Prosecution History for U.S. Appl. No. 14/626,966, filed Feb. 20, 2015.

(Continued)

*Primary Examiner* — Neeraj Sharma
(74) *Attorney, Agent, or Firm* — Thompson Coburn LLP

(57) ABSTRACT

Example embodiments are disclosed where a narrative generation platform is integrated with a conversational interface such as a Chatbot to support interactive and dynamic narrative generation in response to speech inputs from users. Such a system can be further integrated with a visualization platform to allow the speech input through the conversational interface to interactively and dynamically focus and control visualizations and/or narratives that accompany the visualizations.

22 Claims, 38 Drawing Sheets

(56) References Cited

U.S. PATENT DOCUMENTS

| | | | |
|---|---|---|---|
| 6,757,362 B1 * | 6/2004 | Cooper | H04M 3/527 379/88.01 |
| 6,917,936 B2 | 7/2005 | Cancedda | |
| 6,968,316 B1 | 11/2005 | Hamilton | |
| 6,976,031 B1 | 12/2005 | Toupal et al. | |
| 7,246,315 B1 | 7/2007 | Andrieu et al. | |
| 7,324,936 B2 | 1/2008 | Saldanha et al. | |
| 7,333,967 B1 | 2/2008 | Bringsjord et al. | |
| 7,496,621 B2 | 2/2009 | Pan et al. | |
| 7,577,634 B2 | 8/2009 | Ryan et al. | |
| 7,610,279 B2 | 10/2009 | Budzik et al. | |
| 7,617,199 B2 | 11/2009 | Budzik et al. | |
| 7,617,200 B2 | 11/2009 | Budzik et al. | |
| 7,627,565 B2 | 12/2009 | Budzik et al. | |
| 7,644,072 B2 | 1/2010 | Budzik et al. | |
| 7,657,518 B2 | 2/2010 | Budzik et al. | |
| 7,716,116 B2 | 5/2010 | Schiller | |
| 7,778,895 B1 | 8/2010 | Baxter et al. | |
| 7,836,010 B2 | 11/2010 | Hammond et al. | |
| 7,840,448 B2 | 11/2010 | Musgrove et al. | |
| 7,856,390 B2 | 12/2010 | Schiller | |
| 7,865,496 B1 | 1/2011 | Schiller | |
| 7,930,169 B2 | 4/2011 | Billerey-Mosier | |
| 8,046,226 B2 | 10/2011 | Soble et al. | |
| 8,355,903 B1 | 1/2013 | Birnbaum et al. | |
| 8,374,848 B1 | 2/2013 | Birnbaum et al. | |
| 8,447,604 B1 | 5/2013 | Chang | |
| 8,463,695 B2 | 6/2013 | Schiller | |
| 8,494,944 B2 | 7/2013 | Schiller | |
| 8,515,737 B2 | 8/2013 | Allen | |
| 8,630,844 B1 | 1/2014 | Nichols et al. | |
| 8,630,912 B2 | 1/2014 | Seki et al. | |
| 8,630,919 B2 | 1/2014 | Baran et al. | |
| 8,676,691 B2 | 3/2014 | Schiller | |
| 8,688,434 B1 | 4/2014 | Birnbaum et al. | |
| 8,762,133 B2 | 6/2014 | Reiter | |
| 8,762,134 B2 | 6/2014 | Reiter | |
| 8,775,161 B1 | 7/2014 | Nichols et al. | |
| 8,812,311 B2 | 8/2014 | Weber | |
| 8,843,363 B2 | 9/2014 | Birnbaum et al. | |
| 8,886,520 B1 | 11/2014 | Nichols et al. | |
| 8,892,417 B1 | 11/2014 | Nichols et al. | |
| 9,135,244 B2 | 9/2015 | Reiter | |
| 9,208,147 B1 | 12/2015 | Nichols et al. | |
| 9,244,894 B1 | 1/2016 | Dale et al. | |
| 9,251,134 B2 | 2/2016 | Birnbaum et al. | |
| 9,323,743 B2 | 4/2016 | Reiter | |
| 9,336,193 B2 | 5/2016 | Logan et al. | |
| 9,355,093 B2 | 5/2016 | Reiter | |
| 9,396,168 B2 | 7/2016 | Birnbaum et al. | |
| 9,396,181 B1 | 7/2016 | Sripada et al. | |
| 9,396,758 B2 | 7/2016 | Oz et al. | |
| 9,405,448 B2 | 8/2016 | Reiter | |
| 9,424,254 B2 | 8/2016 | Howald et al. | |
| 9,430,557 B2 | 8/2016 | Bhat et al. | |
| 9,460,075 B2 | 10/2016 | Mungi et al. | |
| 9,529,795 B2 | 12/2016 | Kondadadi et al. | |
| 9,576,009 B1 | 2/2017 | Hammond et al. | |
| 9,720,899 B1 | 8/2017 | Birnbaum et al. | |
| 9,977,773 B1 | 5/2018 | Birnbaum et al. | |
| 9,990,337 B2 | 6/2018 | Birnbaum et al. | |
| 10,115,108 B1 | 10/2018 | Gendelev et al. | |
| 10,185,477 B1 | 1/2019 | Paley et al. | |
| 2002/0083025 A1 | 6/2002 | Robarts et al. | |
| 2002/0107721 A1 | 8/2002 | Darwent et al. | |
| 2003/0061029 A1 | 3/2003 | Shaket | |
| 2003/0216905 A1 | 11/2003 | Chelba et al. | |
| 2004/0034520 A1 | 2/2004 | Langkilde-Geary et al. | |
| 2004/0138899 A1 | 7/2004 | Birnbaum et al. | |
| 2004/0225651 A1 | 11/2004 | Musgrove et al. | |
| 2004/0255232 A1 | 12/2004 | Hammond et al. | |
| 2005/0027704 A1 | 2/2005 | Hammond et al. | |
| 2005/0028156 A1 | 2/2005 | Hammond et al. | |
| 2005/0033582 A1 * | 2/2005 | Gadd | G06Q 30/02 704/277 |
| 2005/0049852 A1 | 3/2005 | Chao | |
| 2005/0125213 A1 | 6/2005 | Chen et al. | |
| 2005/0137854 A1 | 6/2005 | Cancedda et al. | |
| 2005/0273362 A1 | 12/2005 | Harris et al. | |
| 2006/0031182 A1 | 2/2006 | Ryan et al. | |
| 2006/0101335 A1 | 5/2006 | Pisciottano | |
| 2006/0181531 A1 | 8/2006 | Goldschmidt | |
| 2006/0212446 A1 | 9/2006 | Hammond et al. | |
| 2006/0271535 A1 | 11/2006 | Hammond et al. | |
| 2006/0277168 A1 | 12/2006 | Hammond et al. | |
| 2007/0132767 A1 | 6/2007 | Wright et al. | |
| 2007/0185846 A1 | 8/2007 | Budzik et al. | |
| 2007/0185847 A1 | 8/2007 | Budzik et al. | |
| 2007/0185861 A1 | 8/2007 | Budzik et al. | |
| 2007/0185862 A1 | 8/2007 | Budzik et al. | |
| 2007/0185863 A1 | 8/2007 | Budzik et al. | |
| 2007/0185864 A1 | 8/2007 | Budzik et al. | |
| 2007/0185865 A1 | 8/2007 | Budzik et al. | |
| 2007/0250479 A1 | 10/2007 | Lunt et al. | |
| 2007/0250826 A1 | 10/2007 | O'Brien | |
| 2008/0250070 A1 | 10/2008 | Abdulla et al. | |
| 2008/0256066 A1 | 10/2008 | Zuckerman et al. | |
| 2008/0304808 A1 | 12/2008 | Newell et al. | |
| 2008/0306882 A1 | 12/2008 | Schiller | |
| 2008/0313130 A1 | 12/2008 | Hammond et al. | |
| 2009/0019013 A1 | 1/2009 | Tareen et al. | |
| 2009/0030899 A1 | 1/2009 | Tareen et al. | |
| 2009/0049041 A1 | 2/2009 | Tareen et al. | |
| 2009/0083288 A1 | 3/2009 | LeDain et al. | |
| 2009/0119584 A1 * | 5/2009 | Herbst | G06F 16/367 715/273 |
| 2009/0144608 A1 | 6/2009 | Oisel et al. | |
| 2009/0175545 A1 | 7/2009 | Cancedda et al. | |
| 2009/0248399 A1 * | 10/2009 | Au | G06F 17/27 704/9 |
| 2010/0146393 A1 | 6/2010 | Land et al. | |
| 2010/0161541 A1 | 6/2010 | Covannon et al. | |
| 2011/0022941 A1 | 1/2011 | Osborne et al. | |
| 2011/0044447 A1 | 2/2011 | Morris et al. | |
| 2011/0077958 A1 | 3/2011 | Breitenstein et al. | |
| 2011/0078105 A1 | 3/2011 | Wallace | |
| 2011/0087486 A1 | 4/2011 | Schiller | |
| 2011/0099184 A1 | 4/2011 | Symington | |
| 2011/0113315 A1 | 5/2011 | Datha et al. | |
| 2011/0213642 A1 * | 9/2011 | Makar | G06Q 10/10 705/7.38 |
| 2011/0246182 A1 | 10/2011 | Allen | |
| 2011/0249953 A1 | 10/2011 | Suri et al. | |
| 2011/0288852 A1 | 11/2011 | Dymetman et al. | |
| 2011/0295903 A1 | 12/2011 | Chen | |
| 2011/0314381 A1 | 12/2011 | Fuller et al. | |
| 2012/0011428 A1 | 1/2012 | Chisholm | |
| 2012/0041903 A1 * | 2/2012 | Beilby | G06N 3/004 706/11 |
| 2012/0069131 A1 | 3/2012 | Abelow | |
| 2012/0109637 A1 | 5/2012 | Merugu et al. | |
| 2012/0158850 A1 | 6/2012 | Harrison et al. | |
| 2013/0041677 A1 | 2/2013 | Nusimow et al. | |
| 2013/0091031 A1 | 4/2013 | Baran et al. | |
| 2013/0145242 A1 | 6/2013 | Birnbaum et al. | |
| 2013/0174026 A1 | 7/2013 | Locke | |
| 2013/0211855 A1 | 8/2013 | Eberle et al. | |
| 2013/0246934 A1 | 9/2013 | Wade et al. | |
| 2013/0262092 A1 | 10/2013 | Wasick | |
| 2013/0304507 A1 | 11/2013 | Dail et al. | |
| 2013/0316834 A1 * | 11/2013 | Vogel | G07F 17/3272 463/42 |
| 2014/0163962 A1 | 6/2014 | Castelli et al. | |
| 2014/0200878 A1 | 7/2014 | Mylonakis et al. | |
| 2014/0314225 A1 * | 10/2014 | Riahi | G06Q 30/02 379/265.09 |
| 2014/0356833 A1 | 12/2014 | Sabczynski et al. | |
| 2014/0372850 A1 * | 12/2014 | Campbell | G06F 40/18 715/212 |
| 2014/0375466 A1 | 12/2014 | Reiter | |
| 2015/0049951 A1 | 2/2015 | Chaturvedi et al. | |
| 2015/0078232 A1 | 3/2015 | Djinki et al. | |
| 2015/0142704 A1 | 5/2015 | London | |
| 2015/0169548 A1 | 6/2015 | Reiter | |

(56) References Cited

U.S. PATENT DOCUMENTS

| | | | |
|---|---|---|---|
| 2015/0186504 A1 | 7/2015 | Gorman et al. | |
| 2015/0199339 A1 | 7/2015 | Mirkin et al. | |
| 2015/0227508 A1 | 8/2015 | Howald et al. | |
| 2015/0227588 A1 | 8/2015 | Shapira et al. | |
| 2015/0242384 A1 | 8/2015 | Reiter | |
| 2015/0261745 A1 | 9/2015 | Song et al. | |
| 2015/0324347 A1 | 11/2015 | Bradshaw et al. | |
| 2015/0324351 A1 | 11/2015 | Sripada et al. | |
| 2015/0324374 A1 | 11/2015 | Sripada et al. | |
| 2015/0325000 A1 | 11/2015 | Sripada | |
| 2015/0331846 A1* | 11/2015 | Guggilla | G06F 16/9017 704/9 |
| 2015/0331850 A1 | 11/2015 | Ramish | |
| 2015/0347400 A1 | 12/2015 | Sripada | |
| 2015/0347901 A1 | 12/2015 | Cama et al. | |
| 2015/0356967 A1* | 12/2015 | Byron | G10L 13/033 704/260 |
| 2015/0363364 A1 | 12/2015 | Sripada | |
| 2015/0370778 A1 | 12/2015 | Tremblay et al. | |
| 2016/0019200 A1 | 1/2016 | Allen | |
| 2016/0026253 A1 | 1/2016 | Bradski et al. | |
| 2016/0027125 A1 | 1/2016 | Bryce | |
| 2016/0132489 A1 | 5/2016 | Reiter | |
| 2016/0140090 A1 | 5/2016 | Dale et al. | |
| 2016/0217133 A1 | 7/2016 | Reiter et al. | |
| 2016/0232152 A1 | 8/2016 | Mahamood | |
| 2016/0232221 A1 | 8/2016 | McCloskey et al. | |
| 2017/0004415 A1 | 1/2017 | Moretti et al. | |
| 2017/0017897 A1 | 1/2017 | Bugay et al. | |
| 2017/0026705 A1 | 1/2017 | Yeh et al. | |
| 2017/0060857 A1 | 3/2017 | Imbruce et al. | |
| 2017/0061093 A1 | 3/2017 | Amarasingham et al. | |
| 2017/0116327 A1 | 4/2017 | Gorelick et al. | |
| 2017/0199928 A1 | 7/2017 | Zhao et al. | |
| 2017/0242886 A1 | 8/2017 | Jolley et al. | |
| 2017/0270105 A1 | 9/2017 | Ninan et al. | |
| 2017/0358295 A1 | 12/2017 | Roux et al. | |
| 2017/0371856 A1 | 12/2017 | Can et al. | |
| 2018/0025726 A1 | 1/2018 | Gatti de Bayser et al. | |
| 2018/0082184 A1 | 3/2018 | Guo et al. | |
| 2018/0114158 A1 | 4/2018 | Foubert et al. | |
| 2018/0260380 A1 | 9/2018 | Birnbaum et al. | |
| 2018/0285324 A1 | 10/2018 | Birnbaum et al. | |
| 2018/0293483 A1 | 10/2018 | Abramson et al. | |
| 2018/0314689 A1 | 11/2018 | Wang et al. | |

FOREIGN PATENT DOCUMENTS

| | | |
|---|---|---|
| WO | 2014035400 A1 | 3/2014 |
| WO | 2014035402 A1 | 3/2014 |
| WO | 2014035403 A1 | 3/2014 |
| WO | 2014035406 A1 | 3/2014 |
| WO | 2014035407 A1 | 3/2014 |
| WO | 2014035447 A1 | 3/2014 |
| WO | 2014070197 A1 | 5/2014 |
| WO | 2014076524 A1 | 5/2014 |
| WO | 2014076525 A1 | 5/2014 |
| WO | 2014102568 A1 | 7/2014 |
| WO | 2014102569 A1 | 7/2014 |
| WO | 2014111753 A1 | 7/2014 |
| WO | 2015028844 A1 | 3/2015 |
| WO | 2015159133 A1 | 10/2015 |

OTHER PUBLICATIONS

Prosecution History for U.S. Appl. No. 15/011,743, filed Feb. 1, 2016.

Reiter et al., "Building Applied Natural Generation Systems", Cambridge University Press, 1995, pp. 1-32.

Reiter, E. (2007). An architecture for Data-To-Text systems. In: Busemann, Stephan (Ed.), Proceedings of the 11th European Workshop on Natural Language Generation, pp. 97-104.

Reiter, E., Gatt, A., Portet, F., and van der Meulen, M. (2008). The importance of narrative and other lessons from an evaluation of an NLG system that summarises clinical data. Proceedings of the 5th International Conference on Natural Language Generation.

Reiter, E., Sripada, S., Hunter, J., Yu, J., and Davy, I. (2005). Choosing words in computer-generated weather forecasts. Artificial Intelligence, 167:137-169.

Response to Office Action for U.S. Appl. No. 13/464,635 dated Jun. 4, 2015.

Riedl et al., "Narrative Planning: Balancing Plot and Character", Journal of Artificial Intelligence Research, 2010, pp. 217-268, vol. 39.

Robin, J. (1996). Evaluating the portability of revision rules for incremental summary generation. Paper presented at Proceedings of the 34th. Annual Meeting of the Association for Computational Linguistics (ACL'96), Santa Cruz, CA.

Rui, Y., Gupta, A., and Acero, A. 2000. Automatically extracting highlights for TV Baseball programs. In Proceedings of the eighth ACM international conference on Multimedia. (Marina del Rey, California, United States). ACM Press, New York, NY 105-115.

Sripada, S., Reiter, E., and Davy, I. (2003). SumTime-Mousam: Configurable Marine Weather Forecast Generator. Expert Update 6(3):4-10.

Storyview, Screenplay Systems, 2000, user manual.

Theune, M., Klabbers, E., Odijk, J., dePijper, J., and Krahmer, E. (2001) "From Data to Speech: A General Approach", Natural Language Engineering 7(1): 47-86.

Thomas, K., and Sripada, S. (2007). Atlas.txt: Linking Geo-referenced Data to Text for NLG. Paper presented at Proceedings of the 2007 European Natural Language Generation Workshop (ENLGO7).

Thomas, K., and Sripada, S. (2008). What's in a message? Interpreting Geo-referenced Data for the Visually-impaired. Proceedings of the Int. conference on NLG.

Thomas, K., Sumegi, L., Ferres, L., and Sripada, S. (2008). Enabling Access to Geo-referenced Information: Atlas.txt. Proceedings of the Cross-disciplinary Conference on Web Accessibility.

Van der Meulen, M., Logie, R., Freer, Y., Sykes, C., McIntosh, N., and Hunter, J. (2008). When a Graph is Poorer than 100 Words: A Comparison of Computerised Natural Language Generation, Human Generated Descriptions and Graphical Displays in Neonatal Intensive Care. Applied Cognitive Psychology.

Yu, J., Reiter, E., Hunter, J., and Mellish, C. (2007). Choosing the content of textual summaries of large time-series data sets. Natural Language Engineering, 13:25-49.

Yu, J., Reiter, E., Hunter, J., and Sripada, S. (2003). Sumtime-Turbine: A Knowledge-Based System to Communicate Time Series Data in the Gas Turbine Domain. In P Chung et al. (Eds) Developments in Applied Artificial Intelligence: Proceedings of IEA/AIE-2003, pp. 379-384. Springer (LNAI 2718).

Allen et al., "StatsMonkey: A Data-Driven Sports Narrative Writer", Computational Models of Narrative: Papers from the AAAI Fall Symposium, Nov. 2010, 2 pages.

Andersen, P., Hayes, P., Huettner, A., Schmandt, L., Nirenburg, I., and Weinstein, S. (1992). Automatic extraction of facts from press releases to generate news stones. In Proceedings of the third conference on Applied natural language processing. (Trento, Italy). ACM Press, New York, NY, 170-177.

Andre, E., Herzog, G., & Rist, T. (1988). On the simultaneous interpretation of real world image sequences and their natural language description: the system SOCCER. Paper presented at Proceedings of the 8th. European Conference on Artificial Intelligence (ECAI), Munich.

Asset Economics, Inc. (Feb. 11, 2011).

Bailey, P. (1999). Searching for Storiness: Story-Generation from a Reader's Perspective. AAAI Technical Report FS-99-01.

Bethem, T., Burton, J., Caldwell, T., Evans, M., Kittredge, R., Lavoie, B., and Werner, J. (2005). Generation of Real-time Narrative Summaries for Real-time Water Levels and Meteorological Observations in PORTS®. In Proceedings of the Fourth Conference on Artificial Intelligence Applications to Environmental Sciences (AMS-2005), San Diego, California.

(56) References Cited

OTHER PUBLICATIONS

Bourbeau, L., Carcagno, D., Goldberg, E., Kittredge, R., & Polguere, A. (1990). Bilingual generation of weather forecasts in an operations environment. Paper presented at Proceedings of the 13th International Conference on Computational Linguistics (COLING), Helsinki, Finland, pp. 318-320.

Boyd, S. (1998). TREND: a system for generating intelligent descriptions of time series data. Paper presented at Proceedings of the IEEE international conference on intelligent processing systems (ICIPS-1998).

Character Writer Version 3.1, Typing Chimp Software LLC, 2012, screenshots from working program, pp. 1-19.

Dehn, N. (1981). Story generation after TALE-SPIN. In Proceedings of the Seventh International Joint Conference on Artificial Intelligence. (Vancouver, Canada).

Dramatica Pro version 4, Write Brothers, 1993-2006, user manual.

Gatt, A., and Portet, F. (2009). Text content and task performance in the evaluation of a Natural Language Generation System. Proceedings of the Conference on Recent Advances in Natural Language Processing (RANLP-09).

Gatt, A., Portet, F., Reiter, E., Hunter, J., Mahamood, S., Moncur, W., and Sripada, S. (2009). From data to text in the Neonatal Intensive Care Unit: Using NLG technology for decision support and information management. AI Communications 22, pp. 153-186.

Glahn, H. (1970). Computer-produced worded forecasts. Bulletin of the American Meteorological Society, 51(12), 1126-1131.

Goldberg, E., Driedger, N., & Kittredge, R. (1994). Using Natural-Language Processing to Produce Weather Forecasts. IEEE Expert, 9 (2), 45.

Hargood, C., Millard, D. and Weal, M. (2009) Exploring the Importance of Themes in Narrative Systems.

Hargood, C., Millard, D. and Weal, M. (2009). Investigating a Thematic Approach to Narrative Generation, 2009.

Hunter, J., Freer, Y., Gatt, A., Logie, R., McIntosh, N., van der Meulen, M., Portet, F., Reiter, E., Sripada, S., and Sykes, C. (2008). Summarising Complex ICU Data in Natural Language. AMIA 2008 Annual Symposium Proceedings, pp. 323-327.

Hunter, J., Gatt, A., Portet, F., Reiter, E., and Sripada, S. (2008). Using natural language generation technology to improve information flows in intensive care units. Proceedings of the 5th Conference on Prestigious Applications of Intelligent Systems, PAIS-08.

Kittredge, R., and Lavoie, B. (1998). MeteoCogent: A Knowledge-Based Tool for Generating Weather Forecast Texts. In Proceedings of the American Meteorological Society AI Conference (AMS-98), Phoenix, Arizona.

Kittredge, R., Polguere, A., & Goldberg, E. (1986). Synthesizing weather reports from formatted data. Paper presented at Proceedings of the 11th International Conference on Computational Linguistics, Bonn, Germany, pp. 563-565.

Kukich, K. (1983). Design of a Knowledge-Based Report Generator. Proceedings of the 21st Conference of the Association for Computational Linguistics, Cambridge, MA, pp. 145-150.

Kukich, K. (1983). Knowledge-Based Report Generation: A Technique for Automatically Generating Natural Language Reports from Databases. Paper presented at Proceedings of the Sixth International ACM SIGIR Conference, Washington, DC.

McKeown, K., Kukich, K., & Shaw, J. (1994). Practical issues in automatic documentation generation. 4th Conference on Applied Natural Language Processing, Stuttgart, Germany, pp. 7-14.

Meehan, James R., TALE-SPIN. (1977). An Interactive Program that Writes Stories. In Proceedings of the Fifth International Joint Conference on Artificial Intelligence.

Memorandum Opinion and Order for *O2 Media, LLC* v. *Narrative Science Inc.*, Case 1:15-cv-05129 (N.D. II), Feb. 25, 2016, 25 pages (invalidating claims of U.S. Pat. Nos. 7,856,390, 8,494,944, and 8,676,691 owned by O2 Media, LLC.

Moncur, W., and Reiter, E. (2007). How Much to Tell? Disseminating Affective Information across a Social Network. Proceedings of Second International Workshop on Personalisation for e-Health.

Moncur, W., Masthoff, J., Reiter, E. (2008) What Do You Want to Know? Investigating the Information Requirements of Patient Supporters. 21st IEEE International Symposium on Computer-Based Medical Systems (CBMS 2008), pp. 443-448.

Movie Magic Screenwriter, Writer Brothers, 2009, user manual.

Office Action for U.S. Appl. No. 13/464,635 dated Feb. 22, 2016.
Office Action for U.S. Appl. No. 14/521,264 dated Jun. 24, 2016.
Office Action for U.S. Appl. No. 14/521,264 dated Nov. 25, 2016.
Office Action for U.S. Appl. No. 14/570,834 dated Aug. 23, 2016.
Office Action for U.S. Appl. No. 14/626,966 dated Jan. 25, 2016.
Office Action for U.S. Appl. No. 14/626,966 dated Jul. 15, 2016.

Portet, F., Reiter, E., Gatt, A., Hunter, J., Sripada, S., Freer, Y., and Sykes, C. (2009). Automatic Generation of Textual Summaries from Neonatal Intensive Care Data. Artificial Intelligence.

Portet, F., Reiter, E., Hunter, J., and Sripada, S. (2007). Automatic Generation of Textual Summaries from Neonatal Intensive Care Data. In: Bellazzi, Riccardo, Ameen Abu-Hanna and Jim Hunter (Ed.), 11th Conference on Artificial Intelligence in Medicine (AIME 07), pp. 227-236.

Prosecution History for U.S. Appl. No. 12/779,636, now U.S. Pat. No. 8,688,434, filed May 13, 2010.
Prosecution History for U.S. Appl. No. 12/779,668, now U.S. Pat. No. 8,374,848, filed May 13, 2010.
Prosecution History for U.S. Appl. No. 12/779,683, now U.S. Pat. No. 8,355,903, filed May 13, 2010.
Prosecution History for U.S. Appl. No. 13/186,308, now U.S. Pat. No. 8,775,161, filed Jul. 19, 2011.
Prosecution History for U.S. Appl. No. 13/186,329, now U.S. Pat. No. 8,892,417, filed Jul. 19, 2011.
Prosecution History for U.S. Appl. No. 13/186,337, now U.S. Pat. No. 8,886,520, filed Jul. 19, 2011.
Prosecution History for U.S. Appl. No. 13/186,346, filed Jul. 19, 2011.
Prosecution History for U.S. Appl. No. 13/464,635, filed May 4, 2012.
Prosecution History for U.S. Appl. No. 13/464,675, filed May 4, 2012.
Prosecution History for U.S. Appl. No. 13/464,716, now U.S. Pat. No. 8,630,844, filed May 4, 2012.
Prosecution History for U.S. Appl. No. 13/738,560, now U.S. Pat. No. 8,843,363 filed Jan. 10, 2013.
Prosecution History for U.S. Appl. No. 13/738,609, now U.S. Pat. No. 9,251,134 filed Jan. 10, 2013.
Prosecution History for U.S. Appl. No. 14/090,021, now U.S. Pat. No. 9,208,147, filed Nov. 26, 2013.

Riedl et al., "From Linear Story Generation to Branching Story Graphs", IEEE Computer Graphics and Applications, 2006, pp. 23-31.

* cited by examiner

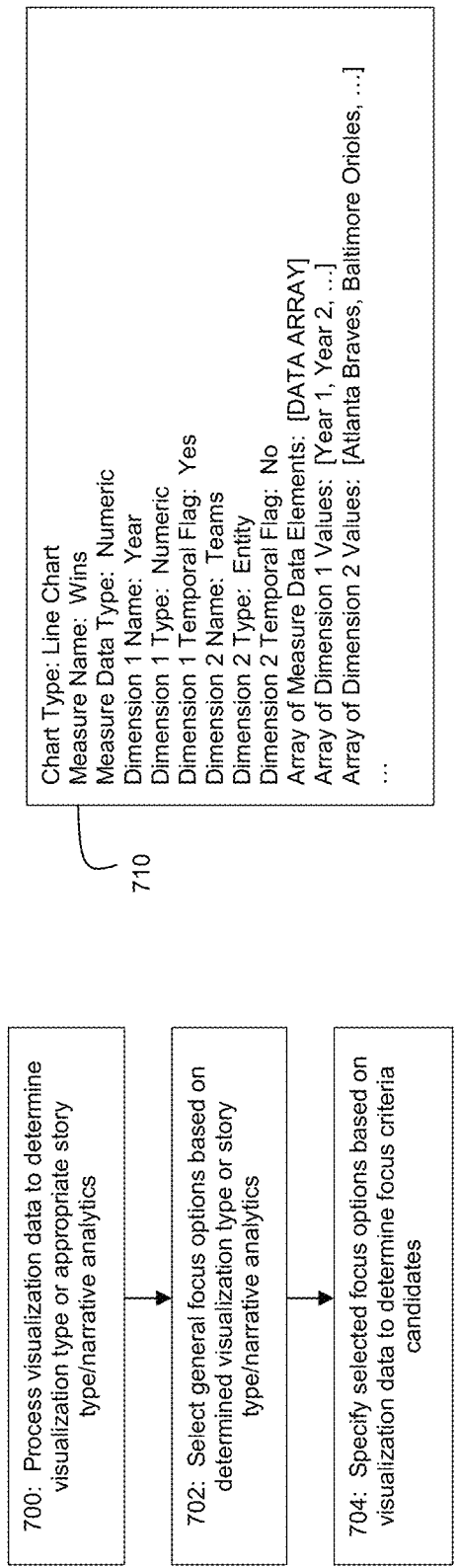

Figure 7A

710

Chart Type: Line Chart
Measure Name: Wins
Measure Data Type: Numeric
Dimension 1 Name: Year
Dimension 1 Type: Numeric
Dimension 1 Temporal Flag: Yes
Dimension 2 Name: Teams
Dimension 2 Type: Entity
Dimension 2 Temporal Flag: No
Array of Measure Data Elements: [DATA ARRAY]
Array of Dimension 1 Values: [Year 1, Year 2, ...]
Array of Dimension 2 Values: [Atlanta Braves, Baltimore Orioles, ...]
...

Figure 7B

| Visualization Type (722) | General Focus Options (724) |
|---|---|
| ... | ... |
| Multi-Entity Line Chart (Time Series) | {Set of General Focus Options} |
| ... | ... |
| ... | ... |

```
                                        830
    "focus":
    {                                    )
    "metric":
    "starting_value",
    "num_items":3,
    "rank_group":"top",
    "measure":"wins",
    "dimension":
    "name","dimension_number":1
    }
```

Figure 8C

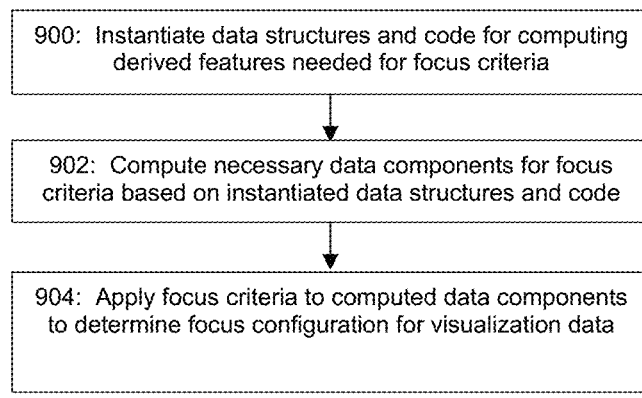

Figure 9A

```
{
"selection": [
"Baltimore Orioles",
"Kansas City Royals",                   910
"New York Yankees"],                     )
"rank_group":
"top",
"selected_elements":
[36, 124, 96],
"metric": "starting_value",
"tie_info": {
"tie_index": [], "has_tie": false, "filter_analytic_failed":
false},
"measure": "wins", "num_items": 3, "dimension_number": 1,
"dimension": "name"}
```

Figure 9B

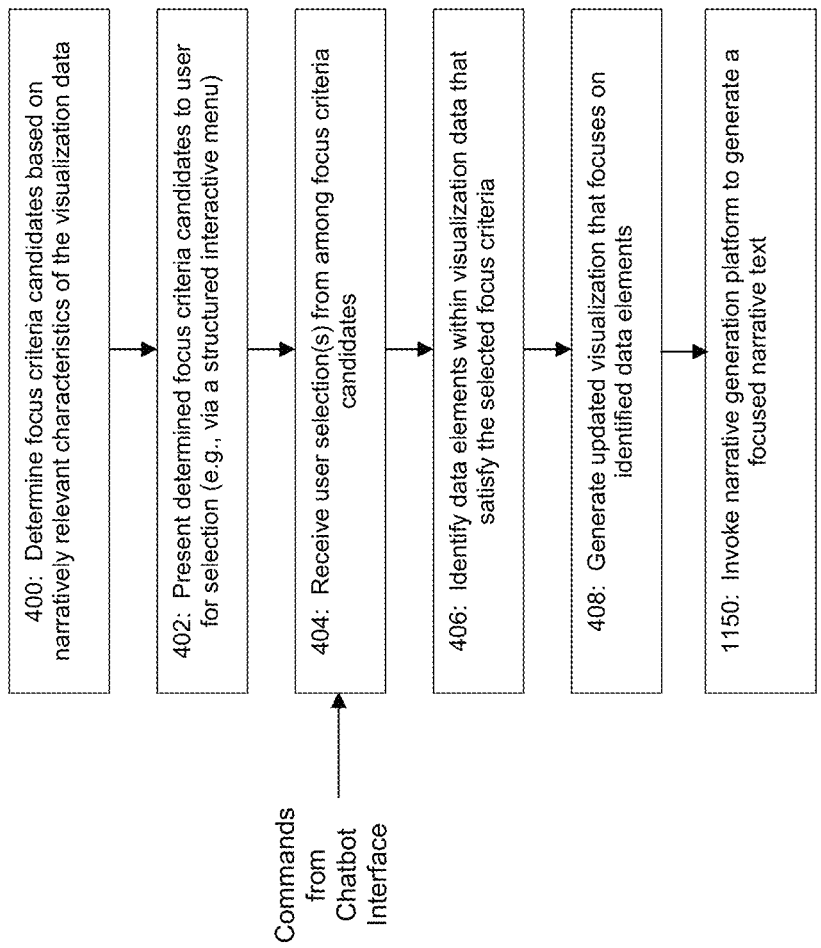

*outsideMeasures: [{"qInfo":{"qId":"kvXwSQ","qType":"measure"},"qMeta":{"title":"Walks per Game","description":"","privileges":["read"],"modifiedDate":"2016-05-20T15:13:12.971Z","published":true,"publishTime":"2016-05-19T15:44:31.180Z","approved":true,"owner":{"id":"d6564e67-6eb3-44d2-a895-485e87ff96e1","userId":"dplatt","userDirectory":"NARRATIVESCIENC","name":"dan Platt","privileges":null},"qSize":-1,"sourceObject":"","draftObject":"","tags":[]},"qData":{"title":"","tags":"","grouping":"N","dim":{"qLabel":" Walks per Game","qDef":"Sum([Pitching.BB])/Sum([Pitching.G])","qGrouping":"N","qExpressions":[],"qActiveExpression":0},"exp":"Sum([Pitching.BB])/Sum([Pitching.G])","info":"","all":""}}]*

Figure 17A

```
"outside_series":[{"id":"qRJfjQw","label":"Home
Runs","values":[118.73076923076923,68.5,129.96153846153845,126.961538461538
47,125.3076923076923,139.53846153846155,146.65384615384616,171.461538461538
45,122.3076923076923,118.57692307692308,127.57692307692308,130.115384615384
6,116.84615384615384,143.92857142857142,119.07142857142857,145.75,177.21428
571428572,165.71428571428572,168.8,184.2666666666668,189.7666666666668,18
1.93333333333334,168.63333333333333,173.5666666666666,181.7,167.2333333333
3332,179.53333333333333,165.23333333333332,162.6,168.0666666666666,153.766
66666666668,151.73333333333332,164.4666666666667,155.3666666666667,139.53
333333333333,163.63333333333333],"text_values":["118.73077","68.5","129.961
54","126.96154","125.30769","139.53846","146.65385","171.46154","122.30769"
,"118.57692","127.57692","130.11538","116.84615","143.92857","119.07143","1
45.75","177.21429","165.71429","168.8","184.26667","189.76667","181.93333",
"168.63333","173.56667","181.7","167.23333","179.53333","165.23333","162.6"
,"168.06667","153.76667","151.73333","164.46667","155.36667","139.53333","1
63.63333"],"element_numbers":[0,0,0,0,0,0,0,0,0,0,0,0,0,0,0,0,0,0,0,0,0,0,0
,0,0,0,0,0,0,0,0,0,0,0,0,0]}]
```

Figure 17B

Analytics

Choose which analytics to consider when writing the narrative and rank their importance:

▶ Segments

▶ Trendline

Figure 19

- - - -
• Contrasting with the overall increase, the largest net decline was from Aug-2012 to Jan-2013, when Sales decreased by 2,393,415 (57.76%).

Figure 20

{"segments":{"id":"segments","index":0,*"enabled":true*,"requiresMulti":false,"label":"Segments","expandable":true,"open":true,"thresholds":{"inclusion":{"value":2},"formatting":null}}

Figure 21

Analytics

Choose which analytics to consider when writing the narrative and rank their importance:

▸ Segments

▸ Trendline

Figure 22

For this selection, the chart measures Sales by YearMonth.

- Average of Sales was 3,280,512 across all 30 periods.
- Values ranged from 1,288,101 (Jan-2012) to 5,391,802 (Jun-2014).
- Sales increased 318.59% over the course of the series from 1,288,101 to 5,391,802. The largest single increase on a percentage basis, which was 95.69% from 1,520,349 to 2,975,195, occurred between Apr-2012 and May-2012. However, the largest single increase on an absolute basis, which was a rise of 1,534,999 from 3,540,828 to 5,075,828, occurred between Jul-2013 and Aug-2013.
- The largest single decrease immediately followed the biggest single increase, when it fell 43.94% from 2,975,195 to 1,667,986 between May-2012 and Jun-2012.
- The overall linear trend of the series rose at 101,236 per period for an absolute change of 2,935,850 over the course of the series. The trend line was a reasonable fit (R-squared 0.55). If this trend continued for the next three periods, Sales is predicted to be about 5,052,145. With 95% confidence, Sales will be between 3,239,026 and 6,865,264.
- Sales fluctuated over the course of the series with 64.29% of data points moving in an opposite direction from the previous point.

Figure 23

Choose which analytics to consider when writing the narrative and rank their importance:

▸ Segments

Segments are noteworthy/interesting portions of a series with movements of a certain percentage of change. To be considered a segment, the portion must be comprised of more than one period. What is the minimum percentage of change you would like to write about?

{"segments":{"id":"segments","index":0,"enabled":true,"requiresMulti":false,"label":"Segments","expandable":true,"open":true,*"thre sholds":{"inclusion":{"value":2},*"formatting":null}}

Figure 26 name: include_negativeRuns  type: Bool  status: active self type: Run  Group:

Set argument keypath for testing:
$viz.series_by_rank.0.properties.maximum_value_run_negative

*Computed Value* false  Hide trace

Evaluation trace:
▼ Define false
  ▼ GreaterThan false
    • $self.abs_value_pct_diff  0.57760814531711126
    • $self.series.viz.analytics_configuration.negativeRuns.thresholds.inclusion.value : 2

```
1 Define(
2   GreaterThan($self.abs_value_pct_diff, $self.series.viz.analytics_confi
    guration.negativeRuns.thresholds.inclusion.value)
3 )
4
```

"trendline": {"id":"trendline","index":1,"enabled":true,"requiresMulti":false,"label":"Trendline","expandable":true,"open":true,"options":{"prediction_periods":3}}

Figure 30 text content:

selection mode: cycle

If this trend continued for the next $series.properties.trendline_analysis.predictions.prediction_periods 'dimension_tense_customint($series.properties.trendline_analysis.predictions.prediction_periods)', $series.name is 'trendline_formatting_open($series.properties.trendline_analysis)' predicted to be about 'percentage_points($series.properties.trendline_analysis.predictions.fittedvalues)' trendline_formatting_close($series.properties.trendline_analysis)'. With $series.viz.analytics_configuration.trendline.thresholds.inclusion.value.float_multi_hundo.as_percentage confidence, $series.name will be between 'percentage_points($series.properties.trendline_analysis.predictions.ci_lower)' and this blueprint renders as:
If this trend continued for the next three periods, Sales is predicted to be about 5.1 million. With 95% confidence, Sales will be between 3.2 million and 6.9 million.

* The overall linear trend of the series rose at 101,236 per period for an absolute change of 2,935,850 over the course of the series. The trend line was a reasonable fit (R-squared 0.55). If this trend continued for the next three periods, Sales is predicted to be about 5,052,145. With 95% confidence, Sales will be between 3,239,026 and 6,865,264.

Figure 31

- Sales had a significant positive peak between Jun-2012 and Oct-2012, starting at 1,667,986, rising to 4,143,665 at Aug-2012 and ending at 2,223,953.
- Contrasting with the overall increase, the largest net decline was from Aug-2012 to Jan-2013, when Sales decreased by 2,393,415 (57.76%).
- The overall linear trend of the series rose at 101,236 per period for an absolute change of 2,935,850 over the course of the series. The trend line was a reasonable fit (R-squared 0.55). If this trend continued for the next three periods, Sales is predicted to be about 5,052,145. With 95% confidence, Sales will be between 3,239,026 and 6,865,264.
- Sales fluctuated over the course of the series with 64.29% of data points moving in an opposite direction from the previous point.

Figure 32

{"segments":{"id":"segments","index":0,"enabled":true,"requiresMulti":false,"label":"Segments","expandable":true,"open":true,"thresholds":{"inclusion":{"value":0.2},*"formatting":{"value":0.4}*}} name:

[ format_negativeRuns ]

self type:

[ Run ]

type:

[ Bool ]

Group:

[ ]

Set argument keypath for testing:

[ $viz.series_by_rank.0.properties.maximum_value_run_negative ]

[ evaluate ]

true

Evaluation trace:
▼ And  true
   ▼ Exists  true
      ● $self.series.viz.analytics_configuration.negativeRuns.thresholds.formatting  {Formatting model}
   ▼ GreaterThan  true
      ● $self.abs_value_pct_diff  0.5776081453171126
      ● $self.series.viz.analytics_configuration.negativeRuns.thresholds.formatting.value  0.4

```
1 And(
2 Exists($self.series.viz.analytics_configuration.negativeRuns.threshold
  s.formatting),
3 GreaterThan($self.abs_value_pct_diff, $self.series.viz.analytics_confi
  guration.negativeRuns.thresholds.formatting.value)
4 )
```

Figure 36

<li>Contrasting with the overall increase, the largest net decline was from Aug-2012 to Jan-2013, when Sales *<span class="highlight" data-analytic-id="segments" data-sentiment="bad"> decreased by 2,393,415 (57.76%)</span>*.</li>

Figure 37

- Contrasting with the overall increase, the largest net decline was from Aug-2012 to Jan-2013, when Sales decreased by 2,393,415 (57.76%).

Figure 38

INTERACTIVE AND CONVERSATIONAL DATA EXPLORATION

CROSS-REFERENCE AND PRIORITY CLAIM TO RELATED PATENT APPLICATIONS

This patent application claims priority to U.S. provisional patent application Ser. No. 62/458,460, filed Feb. 13, 2017, and entitled "Interactive and Conversational Data Exploration", the entire disclosure of which is incorporated herein by reference.

This patent application is also a continuation-in-part of U.S. patent application Ser. No. 14/570,834, filed Dec. 15, 2014, and entitled "Automatic Generation of Narratives from Data Using Communication Goals and Narrative Analytics", which is a continuation of U.S. patent application Ser. No. 14/521,264, filed Oct. 22, 2014, and entitled "Automatic Generation of Narratives from Data Using Communication Goals and Narrative Analytics", now U.S. Pat. No. 9,720,899, the entire disclosures of each of which are incorporated herein by reference.

This patent application is also a continuation-in-part of U.S. patent application Ser. No. 15/666,151, filed Aug. 1, 2017, and entitled "Applied Artificial Intelligence Technology for Interactively Using Narrative Analytics to Focus and Control Visualizations of Data", which claims priority to U.S. provisional patent application Ser. No. 62/382,063, filed Aug. 31, 2016, and entitled "Applied Artificial Intelligence Technology for Interactively Using Narrative Analytics to Focus and Control Visualizations of Data", the entire disclosures of each of which are incorporated herein by reference.

INTRODUCTION

There is an ever-growing need in the art for improved interactive natural language generation (NLG) technology, particularly interactive NLG technology that generates natural language responses to conversational inputs. NLG is a subfield of artificial intelligence (AI) concerned with technology that produces language as output on the basis of some input information or structure (e.g., where the input constitutes data about a situation to be analyzed and expressed in natural language). It is believed that improvements are needed in the art with respect to how conversational interfaces, including those that process speech inputs, can be used in combination with NLG technology in order to support interactive conversations between humans and machines.

An example of advanced NLG technology is the QUILL' narrative generation platform from Narrative Science Inc. of Chicago, Ill. Aspects of this technology are described in the following patents and patent applications: U.S. Pat. Nos. 8,374,848, 8,355,903, 8,630,844, 8,688,434, 8,775,161, 8,843,363, 8,886,520, 8,892,417, 9,208,147, 9,251,134, 9,396,168, 9,576,009, 9,697,197, 9,697,492, and 9,720,899; and US patent application Ser. No. 14/211,444 (entitled "Method and System for Configuring Automatic Generation of Narratives from Data", filed Mar. 14, 2014), Ser. No. 14/570,834 (entitled "Automatic Generation of Narratives from Data Using Communication Goals and Narrative Analytics, filed Dec. 15, 2014), Ser. No. 15/253,385 (entitled "Applied Artificial Intelligence Technology for Using Narrative Analytics to Automatically Generate Narratives from Visualization Data, filed Aug. 31, 2016), 62/382,063 (entitled "Applied Artificial Intelligence Technology for Interactively Using Narrative Analytics to Focus and Control Visualizations of Data", filed Aug. 31, 2016), Ser. No. 15/666,151 (entitled "Applied Artificial Intelligence Technology for Interactively Using Narrative Analytics to Focus and Control Visualizations of Data", filed Aug. 1, 2017), 62/460,349 (entitled "Applied Artificial Intelligence Technology for Performing Natural Language Generation (NLG) Using Composable Communication Goals and Ontologies to Generate Narrative Stories", filed Feb. 17, 2017), 62/539,832 (entitled "Applied Artificial Intelligence Technology for Narrative Generation Based on Analysis Communication Goals", filed Aug. 1, 2017), and 62/585,809 (entitled "Applied Artificial Intelligence Technology for Narrative Generation Based on Smart Attributes and Explanation Communication Goals", filed Nov. 14, 2017); the entire disclosures of each of which are incorporated herein by reference.

The technology described in these patents and patent applications can serve as a platform and configuration model for automatic narrative generation and comprises analytic and natural language technology capable of automatically generating narratives based on structured data, in many cases primarily structured numerical data. For example, given data about investment portfolios, such as asset classes, specific assets, investment amounts, and values and changes in values, our system, appropriately configured, is capable of automatically generating narratives discussing the performance of those portfolios over some relevant period of time, e.g., a quarter. Similarly, given data about baseball games, such as box score, line score, and play-by-play information, the system, appropriately configured, is capable of automatically generating baseball game recap stories. For ease of reference, this technology can be referred to herein as a narrative generation artificial intelligence platform (or a narrative generation platform).

Configurations for the narrative generation platform include notional outlines comprising sections; each section comprising one or more communication goals characterizing the nature of the appropriate information to be conveyed in that section, each communication goal specifying or associated with appropriate analytic models or packages comprising methods (e.g., in the form of computer code) relevant to determining the particular information of the appropriate nature based on data at hand in the specific instance, as well as, on their input side, the nature of the relevant data, an appropriate internal data model for those data, and methods for mapping from the actual data to that internal data model. (See Appendix A.) These communication goals are also associated with predicate forms for recasting the results of the associated analytics in an explicit propositional representation, and characterizations or angles for characterizing these results in narratively useful and informative ways. Outlines and sections also include rhetorical models that determine which results are to be voiced in the resulting narrative, and in what order and format. The result of executing the narrative generation platform with such a configuration in conjunction with specific data is a computed outline that explicitly represents the content and form of the narrative to be generated using those data. The system also comprises a configurable natural language generation component that can use the computed outline to generate the narrative in a natural language such as English.

For example, given data about salespeople in a given sales office, an appropriately configured system would be able to generate performance report narratives about those salespeople. The information conveyed in such narratives might track or recap (describe) how the salesperson has performed over some relevant time interval, such as a year or a quarter, according to some relevant performance metric, such as total sales, and how that performance has changed over that interval; evaluate or assess that performance, for example whether it has improved, stayed the same, or declined compared with past performance, how the salesperson's performance ranks overall compared with their peers (e.g., other salespeople in the same office), and/or how it compares to their goal or quota; and explain that performance by looking at key indicators or drivers of overall sales performance, such as the number, quality, and size of opportunities in the pipeline, the amount of time it takes for those opportunities move through the pipeline, and the rate at which they pass hurdles in that pipeline, and ultimately close. The narrative may then drill down to focus on some specific driver, e.g., the quality of sales in the pipeline, in order to help the reader understand how that driver has contributed to overall performance or a trend in that performance.

In other words, a narrative of this sort provides information relevant to three (related) communication goals: track performance, evaluate performance, and explain performance. These communication goals are specified within sections of the notional outline that comprises the configuration for a narrative of this sort. The configuration also comprises elements that enable the system to identify data relevant to achieving these communication goals; analyze the data in appropriate ways to produce information of the sort that would meet those communication goals; cast the results in terms of explicit representations, including narratively useful characterizations; organize these representations in a narratively coherent form; and then finally express the narrative in natural language.

In a certain sense, a well-constructed narrative of this sort will answer certain implicit questions that the reader can be expected to have—these are the information needs that the communication goals aim to fulfill. The answers to these initial questions will tend to raise certain other questions in the reader's mind; and the narrative will go on to answer these questions in turn. To put this in another way, the communication goals that comprise the configuration for the narrative platform correspond to questions the user has or can be expected to have; and the other elements of the system specified by or associated with those communication goals are aimed at answering those questions in a narratively coherent manner.

In a static narrative generated as a whole and all at once by the system for subsequent use by a reader, the configuration should aim to reflect ahead of time, as much as possible, the likely questions a reader will have upon reading the narrative, in order to generate a narrative that will seem coherent, relevant, and useful. However, the narrative generation platform and configuration model, as outlined in the above-referenced and incorporated '264 patent application, was also formulated with the notion that such narratives could be generated interactively. In other words, the system might wait for user input indicating a specific question or interest; and then execute the configuration elements associated with the communication goal corresponding to that question, which include performing the analytics and determining the characterizations relevant to answering that question or addressing those interests, and then convey the results in natural language. The system would then await further action by the user—in other words, follow-up questions—in order to proceed further in generating the narrative. In this way, the narrative unfolds interactively or conversationally, under the control of the user. The elements specified in the configuration (the communication goals and their associated analytics, characterizations, etc.), as well as their specific parameterizations given the current data, provide constraints on what the user might be interested in within the current context that enable the system to properly interpret inputs; and similarly provide the mechanisms for generating appropriate responses.

The kind of interaction or "conversation" described above might be (and often is) carried out via a graphical user interface. However, it might also be carried out via a natural language conversational interface, potentially utilizing speech recognition—what is currently called a chatbot. Accordingly, to fill a need in the art for improvements in interactive conversations between humans and machines, disclosed herein are example embodiments where a narrative generation artificial intelligence platform such as the ones described in the above-referenced and incorporated patents and patent applications are integrated with a conversational interface to provide such interactivity. Also disclosed are example embodiments in the context of specific use cases in interactive data exploration in which the narrative generation platform is integrated with a data visualization platform.

Through these and other features, example embodiments of the invention provide significant technical advances in the NLG arts by harnessing computer technology to improve how narrative generation platforms can be extended and integrated with conversational interfaces to support a wider range of human-machine interaction.

BRIEF DESCRIPTION OF THE DRAWINGS

FIG. 7A depicts an example process flow for the logic used to determine focus criteria candidates with respect to a visualization.

FIG. 7B depicts an example set of visualization data.

FIG. 7C depicts an example mapping of visualization and/or data types to generalized focus options.

FIG. 8C depicts an example focus criteria data structure.

FIG. 9A depicts an example process flow for the logic used to generate a focus configuration for use with a visualization.

FIG. 9B depicts an example focus configuration data structure.

FIGS. 11A-C how focused narratives can be generated as part of the visualization focusing effort.

FIG. 17A depicts an example outside measures data structure.

FIG. 17B depicts an example outside series data structure.

FIGS. 18-23 depict examples of how analytics can be selectively enabled and disabled in an interactive manner.

FIGS. 24-27 depict examples of how thresholds for analytics can be interactively controlled.

Figure 29:
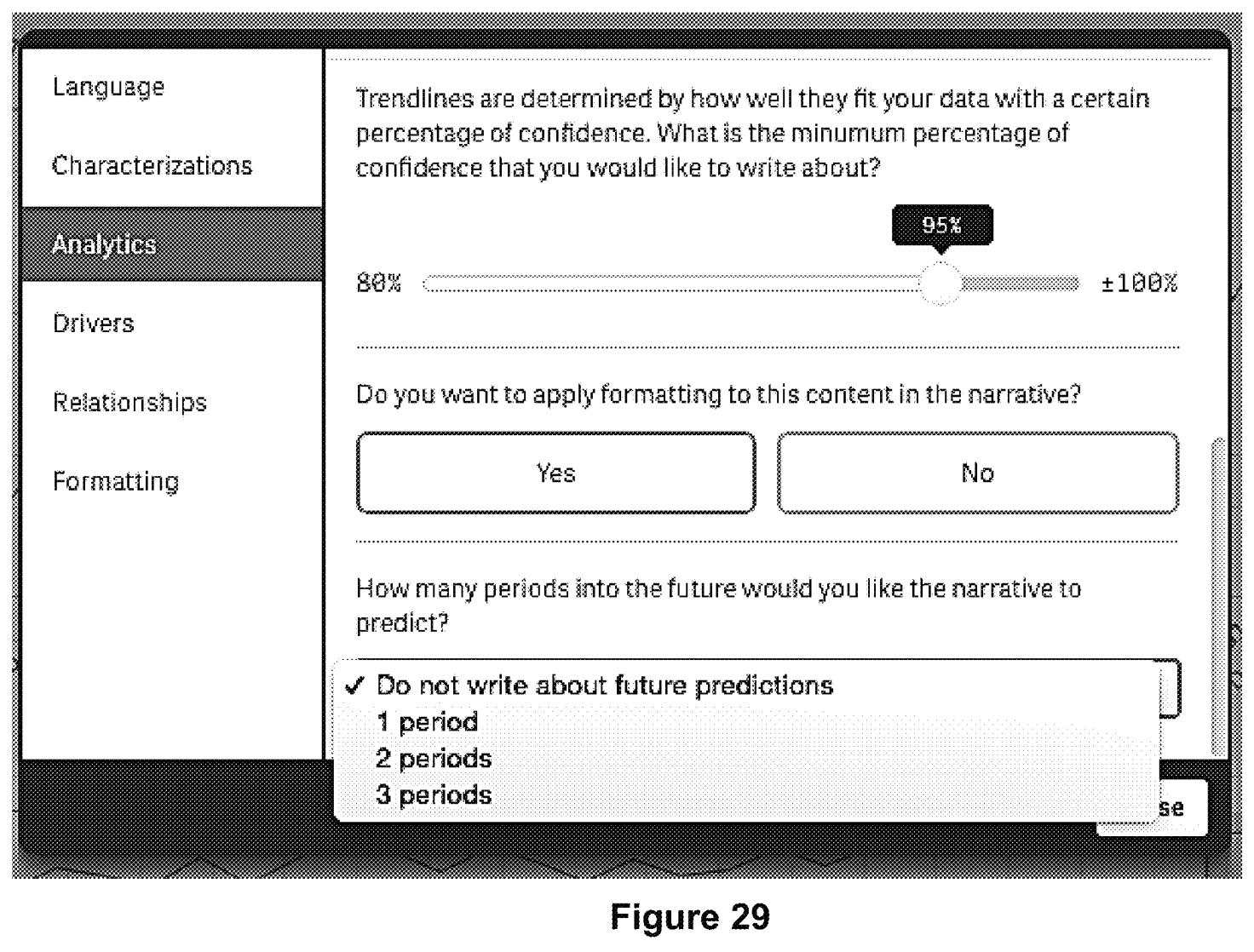

FIGS. 28-31 depict examples of how predictive analytics can be selectively enabled and disabled.

FIGS. 32-38 depict examples of how the formatting of resultant narrative stories can be controlled.

DETAILED DESCRIPTION OF EXAMPLE EMBODIMENTS

Figure 1:
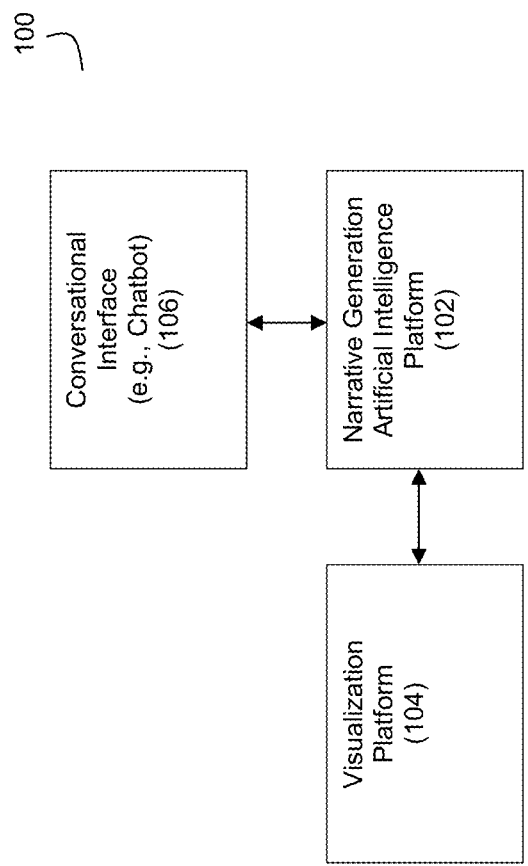
FIG. 1 shows an example embodiment of a system where a narrative generation artificial intelligence platform is in communication with both a visualization platform and a conversational interface.

FIG. 1 shows an example embodiment of a system 100 where a narrative generation artificial intelligence platform 102 is in communication with both a visualization platform 104 and a conversational interface 106 using either text or speech (such as a Chatbot). Through this conversational interface 106, the narrative generation artificial intelligence platform 102 can receive instructions and queries derived from natural language input, e.g., spoken words, for controlling a visualization and/or a narrative story about a visualization.

A. Conversational Interfaces 106

A number of commercial platforms, such as Amazon's Alexa, have been released recently to support conversational interaction via speech interface, and, in some cases, textual input. These platforms generally include a set of application programming interfaces (APIs) that are called from within an application to gather inputs from users, and direct outputs to those users based upon the application's operations given those inputs. Typically speaking, these platforms enable a developer to associate potential user inputs in natural language—i.e., questions or commands—with particular tasks to be executed by the underlying application in response to those inputs. (For example, these tasks are called intents in the Amazon Alexa platform.) When an utterance of the appropriate form is detected, the platform communicates the name of the associated task—the tasks and their names are defined by the application developer—to the underlying application via the API. The system then invokes the appropriate code to execute that task. This may result in carrying out other actions, e.g., playing music, retrieving information, making a purchase, etc.—which the application will control through other APIs to the systems that possess those capabilities.

Because users may phrase their questions or commands in many different ways, chatbot developers using these platforms typically must manually specify large numbers of different forms for association with a given task, a highly labor-intensive and time-consuming process. These forms or patterns may be expressed in terms of keywords; as regular expressions in a regular expression pattern language; or in terms of the more complicated and structured patterns used by a more sophisticated natural language parser. Some platforms (again, e.g., Amazon Alexa) have some capacity to generalize slightly to automatically detect slight variants of the forms directly input by the developers.

The user's utterance may also contain specific information for parameterizing the task appropriately, e.g., the name of the song to be played. This information will be associated with variables appropriately located in the linguistic patterns the developer has associated with the task by the speech/language interface (for example, these are called slots in Alexa). The values of these variables are also communicated to the underlying application via the API. They are then used to parameterize the code comprising the underlying application, which, upon execution, will carry out the appropriate actions specified by, and utilizing, these parameters.

Once the appropriate code in the underlying application has been executed, based on the name of the task communicated via the API, and the parameters of that task, and the appropriate actions have been carried out, results may be communicated back to the user in speech form and/or other modalities (e.g., text, graphics, video, etc.) using the API.

Within the context of chatbot platforms as briefly described here, and in terms of the use cases described below, there can be multiple roles for a narrative generation platform to be used in an interactive manner. For example, the narrative generation platform can be used to dynamically carry out appropriate analytics and generate an appropriate response based on user input—the task or query as indicated by the user, and it's parameterization—and other data.

As another example, the narrative generation platform can be used to help automatically and even dynamically configure aspects of the chatbot platform itself, specifically, the natural language patterns or terms that map to the tasks or intents specified by the developer or otherwise determined to be relevant. For example, as will be described in more detail below, the narrative generation platform, in the course of its operation, creates specific notional entities that may be described in the course of the narrative, for example, "the best salesperson." These entities are then available to be used as referents by a user in the course of a conversational interaction. The narrative generation platform includes a natural language generation (NLG) component that can be used to express these notional entities in natural language. This NLG component uses a library of natural language patterns and terms in order to express these entities in natural language. These patterns can be automatically and even dynamically used to configure the set of input patterns and terms that the chatbot platform uses in order to analyze user inputs. (These patterns may need to be reformatted to fit the specific requirements of the chatbot platform itself.) The chatbot platform is then able to use these patterns and terms to determine the specific intent (query or command) denoted by the user's input, as well as the parameters for that intent provided in the input. This relieves the chatbot developer of the need to manually "program" the chatbot with these expressions and terms in order to perform this determination as is normally required.

More generally, in the current chatbot ecosystem, as discussed above, developers must manually enter the language patterns and terms the system will use to interpret user text or speech inputs, i.e., to map these inputs to user intents and their parameterizations. A narrative generation platform is capable of generating the natural language that will be used to provide responses to the user. The natural language in these responses is often closely correlated with the language that a user might employ in expressing a command (e.g., an intent and its appropriate parameterization) for which the response would be appropriate. Thus, the language patterns and terms used by the platform to generate this natural language are highly correlated with the language patterns and terms needed by the chatbot platform in order to interpret these user inputs can be mined (and, if necessary, transformed) to automatically produce the language patterns needed to parameterize the chatbot interface in order to appropriately interpret such inputs. This can substantially reduce or even eliminate the burden of manually producing and inputting such patterns and terms.

For example, associated with a communication goal such as "track (metric)" might be a predicate form with a language pattern for NLG that would generate a sentence of the form "<name-of(metric)> <tracking period> was <value-of (entity, metric)>." (This, along with language patterns for the metric and the time period might produce a sentence such as, "Revenue last quarter was $47 thousand.") These language patterns for NLG are very similar in form to the question, "What was revenue last quarter?"—which might be a query that the user would input in a conversational interaction. It is therefore possible to automatically generate a language pattern or set of terms that would match this query from the NLG language patterns used to generate answers to the query. These could then be used by the chatbot platform to recognize or "parse" user inputs and map them to the underlying intents (queries or task commands) and their parameterizations. Thus, it should be understood that the narrative generation platform can be used to teach the conversational interface 106 how to better understand natural language inputs from users.

B. Interactive and Conversational Data Exploration Using Narrative Generation Platform 102, Visualization Platform 104, and Conversational Interface 106

The above-referenced and incorporated patents and patent applications describe example embodiments for a narrative generation platform 102, including a narrative generation platform 102 that supports interactive narrative generation in response to user inputs, including textual and speech inputs (see, for example, the '899 patent). The above-referenced and incorporated patent applications also describe how a narrative generation platform 102 can be integrated with a visualization platform 104 to generate narratives that accompany visualizations as well as focus and control of the visualizations and/or narratives (see, for example, the '151 application). For example, the user can specify a data set to visualize; the visualization type to utilize; how the data and meta-data map to parameters of the visualization; and similar parameters. These systems also typically provide users with the capability of adjusting various parameters of the visualization. For example, for line charts, users can typically delimit the range of values on the x-axis for which the visualization will be generated—thus enabling the user to zoom in to focus on particular regions, or zoom out to look at the larger context of some data.

These activities are good examples of the kinds of interactions with software applications that can be readily adapted to control via speech or text interfaces using conversational platforms as described briefly above.

As explained in the above-referenced and incorporated patent applications and as further explained below, a narrative generation system, when linked to a visualization system, can respond dynamically as the user interactively controls the visualization system. For example, specifically, as the user changes his or her selection of the data, the nature or details of the visualization, the range of values over which the visualization will be presented, etc., the narrative generation system can automatically generate a new narrative appropriate to the new visualization created in response to these directives. If the overall system is designed so that the user provides these directives via a conversational speech interface rather than a graphical user interface, the narrative generation system can operate similarly within such an environment to dynamically alter the nature of the narrative accompanying the visualization in response to the user's spoken dialog request. Moreover, if desired, the resulting narrative can be read to the user via a text to speech application. This is the first and most direct way of utilizing conversational interface technology to interactively control narrative generation in the context of exploratory data analysis.

It should be understood that the narrative generation platform 102, when linked to a visualization platform 104 in this manner, provides significantly greater opportunity for user interaction and control than the visualization platform 104 on its own can provide. Some of these enhancements relate to the control and parameterization of aspects of the integrated system that pertain directly to the narrative generation component. For example, a user can control the length or level of detail at which a narrative will be generated; the format to be utilized—paragraphs, bulleted lists, etc.—and so on. Thus, when the overall integrated system, including both the visualization and narrative generation components, is adapted for voice control via a conversational speech interface 106, or a similar text-based conversational interface, these aspects of the user's interaction with and control of the narrative generation component constitute a second avenue for utilizing our narrative generation technology within the context of such an interface.

Perhaps more significantly, and again as described in in the above-referenced and incorporated patent applications and as explained below, the narrative generation platform 102, when linked to a visualization platform 104, provides capabilities for easily manipulating not only the narrative generation platform 102 itself, but the visualization platform 104 as well in useful ways that are unavailable to such systems on their own. For example, the focus filter feature described below makes it easy for users to refer to and focus on narratively and analytically meaningful entities in both the visualization and narrative aspects of the combined system. Thus, for instance, when looking at a crowded line chart with multiple lines tracking the performance of a large number of entities, e.g., baseball teams, against some performance metric, e.g., wins, this feature enables users to focus on narratively and analytically meaningful entities—for example, such as the three most improved teams over the season. The visualization and narrative are then modified to focus on just these three entities.

This capacity isn't available to a visualization system on its own because such systems lack the analytic capacity, and narrative intent, to identify and make available these sorts of entities (e.g., "the three most improved teams over the season") for reference and manipulation by the user. They are not manifest in the raw data and metadata; and so simply aren't available to be presented to the user for selection as parameters for the task of focusing the narrative and the visualization. However, when these visualization systems are integrated with the example narrative generation platform 102 described below, with its analytic and natural language generation capabilities, these additional entities are created as a result of the operation of the system; and hence available for reference and manipulation by the user. In a graphical user interface, these are presented to the user via such interface conventions as (clickable) labels on the chart or in drop-down menus. When connected appropriately to a conversational text or speech interface 106, the ability to focus on these sorts of narratively meaningful entities, and the entities themselves, make possible extremely powerful interactive and conversational explorations of the data. A user simply need state, "Focus on the three most improved teams over the season," and the integrated visualization and narrative generation system, connected to an appropriately configured chatbot interface, will modify the visualization and the accompanying narrative—and again, if desired, read the narrative back to the user through a text to speech application. Moreover, this functionality can be achieved even when the overall system includes no visualization platform 104.

Figure 2:
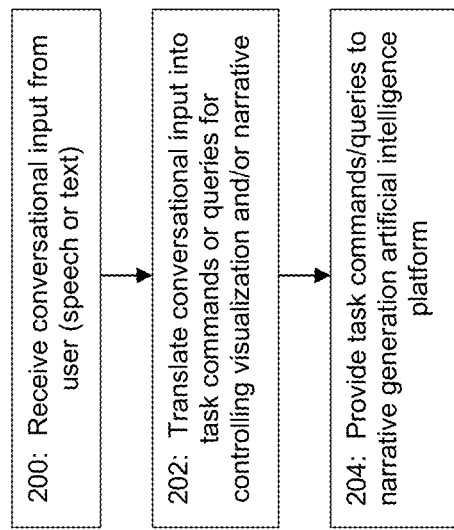
FIG. 2 shows an example process flow for execution by a conversational interface to control the operations of the narrative generation artificial intelligence platform in response to speech or text inputs.

FIG. 2 shows an example process flow for execution by a conversational interface 106 to control the operations of the narrative generation artificial intelligence platform 102. At step 200, the conversational interface receives speech input from a user (e.g., a statement such as "Focus on Entity X", "Focus on the Team with the Most Wins", "Why Was the Best Team So Successful?", etc., in the context of a portion of a narrative and/or a visualization about the performance of various baseball teams). At step 202, the conversational interface translates these spoken words into task commands and queries for controlling the visualization and/or narrative. This translation can use a referent/slot model where various different words or other linguistic forms are associated with specific tasks or queries (e.g., focus tasks, drill down tasks, etc.) and various different words or terms are associated with slots (e.g., names of entities, either specific or notional). Then, at step 204, these task commands are provided to the narrative generation artificial intelligence platform, whereupon the narrative generation artificial intelligence platform updates the narrative and/or visualization based on the task commands.

Figure 11C:
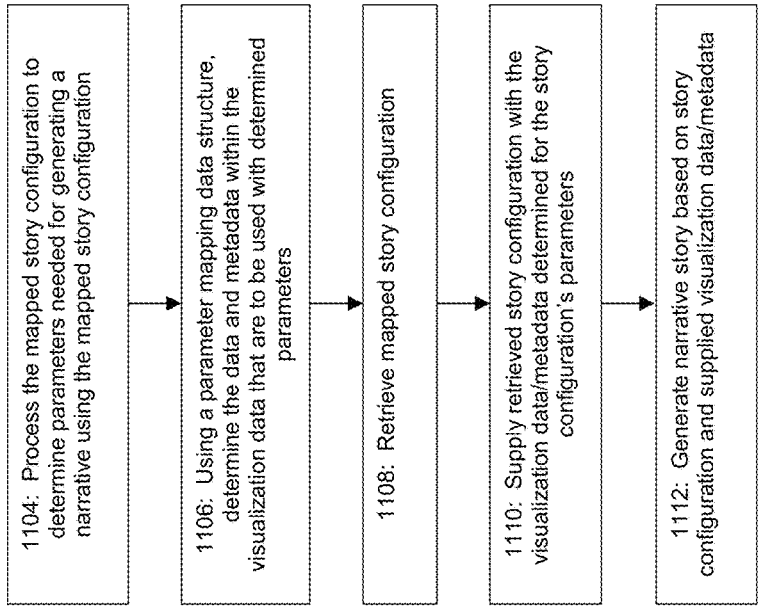

To describe this process in more detail, once a visualization and accompanying narrative have been presented to the user, if the accompanying visualization is a line chart, or specifies other appropriate meta-data, then a task "focus" is enabled. The parameters of this task will determine the action that the system will take. For example, the user mays say "Focus on Entity X." Via its API, the chatbot interface 106 will report to the narrative generation platform 102 that the task is "Focus." The chatbot interface 106 will report as well the parameter "Entity X" as the entity being referred to. The narrative generation platform 102, in response to the task Focus, will then search the set of available entities for reference—which will include not only the original, given entities to be found in the data set (e.g., the Orioles), but the additional entities made available by the narrative analytics of our system—the entities about which a story might be told, such as the best team, the worst team, the most improved team, the least, as well as the two-, three-, or more top (or improved) teams, etc. Our system makes these narratively important entities available for reference by the user in subsequent interaction or conversation; and when referred to by a user through this interface, will relate them to the appropriate actual entities (e.g., the Orioles) and create an updated narrative focusing on these entities, as well as, potentially, an updated visualization by controlling the visualization platform 104 through its API. In other words, a narrative generation platform as described, provides, as part of its processing, a context in terms of which user queries and task specifications can be properly interpreted. As an example embodiment discussed further below, this can be achieved via the process flow of FIG. 4 where commands are received from the conversational interface at step 404. Another example embodiment is shown by FIG. 11A discussed below where commands are received from the conversational interface at step 404.

Another example of the additional interactive control provided by a narrative generation platform 102, including when integrated with a visualization platform 104, is providing users with the ability to drill down to examine drivers of particular metrics for particular entities or aggregate entities. For example, it's possible for users to drill down to visualize and receive a narrative describing the performance of the major stocks or categories driving a change in the overall value of the stock market on a given day, and how they contributed to that change. This capability, when combined with a conversational speech interface 106, as described earlier, can provide users with an extremely powerful interactive, and conversational, interface for data exploration. And again, the resulting narrative can be read to users via a text to speech application. As an example embodiment shown by FIG. 14 discussed below, this can be achieved where commands are received from the conversational interface 106 at step 1404.

Because the results of the interactive manipulations of the visualization and narrative platforms described above can be further manipulated by users, it is possible for a system as described above to support a relatively long interactive dialog in which users simply state how they would like to see the visualization and narrative modified to provide a different perspective or insight, and the system responds appropriately, including by reading the narrative out loud if desired; and in which this cycle can be continued until the user is satisfied with their understanding of the data being presented. Such a system can also support "navigational" utterances; e.g., after looking at a visualization and reading or listening to a narrative describing the important features of the data in that visualization, as generated by our system, the user can use verbal commands to, e.g., "go back" to the previous visualization and narrative.

Figure 3A:
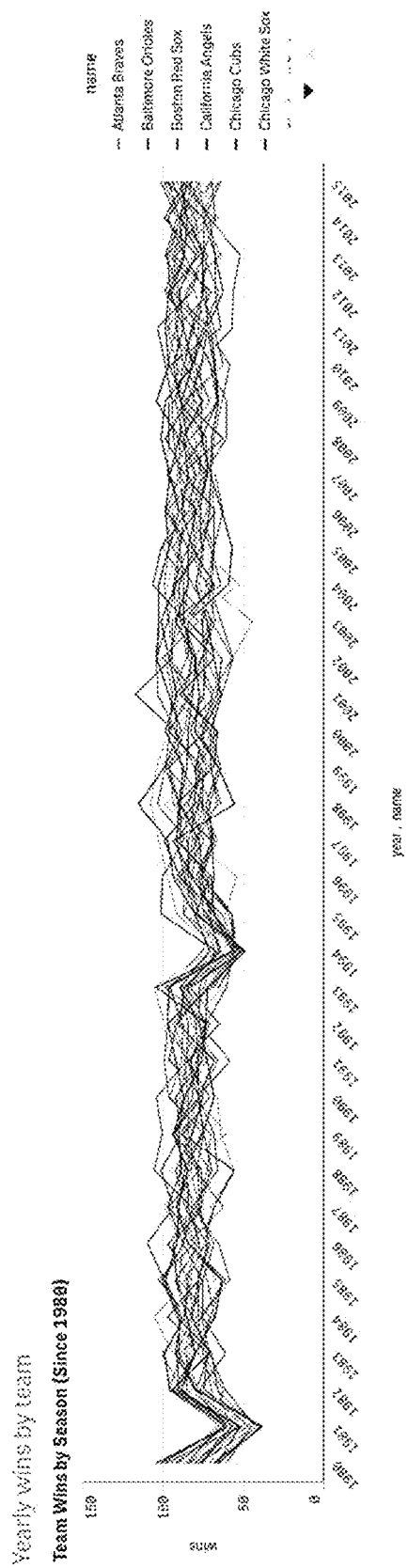
FIG. 3A depicts an example screenshot of a visualization generated from a set of visualization data.

C. Example Embodiments of a Narrative Generation Platform for Focus and Control of Visualizations Using a Conversational Speech Interface Many data visualization software programs enable users to select particular aspects or components of the data presented in a given visualization in order to produce a second, related but distinct visualization, where this second visualization highlights or presents only those selected aspects/components. Such functionality in the visualization software provides users with some degree of an ability to focus a visualization in an interactive manner. For example, FIG. 3A shows an example visualization that plots the number of wins by major league baseball team for each season from 1980 through 2015. The visualization is presented in the form of a line chart, and more specifically a multi-line chart. The vertical axis corresponds to wins while the horizontal axis corresponds to years (seasons), and each line on the chart corresponds to a different baseball team. As can be seen by FIG. 3A, this multi-line chart is extremely dense in terms of information conveyed, and so rather difficult to understand; a user may therefore want to focus in on certain aspects of this visualization in order to understand it better.

Figure 3B:
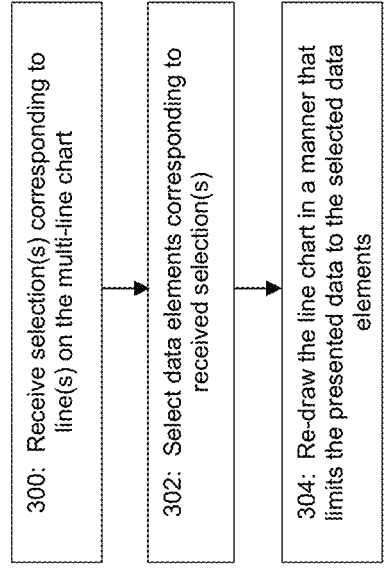
FIG. 3B depicts a process flow for a conventional manner of focusing a visualization.
Figure 3C:
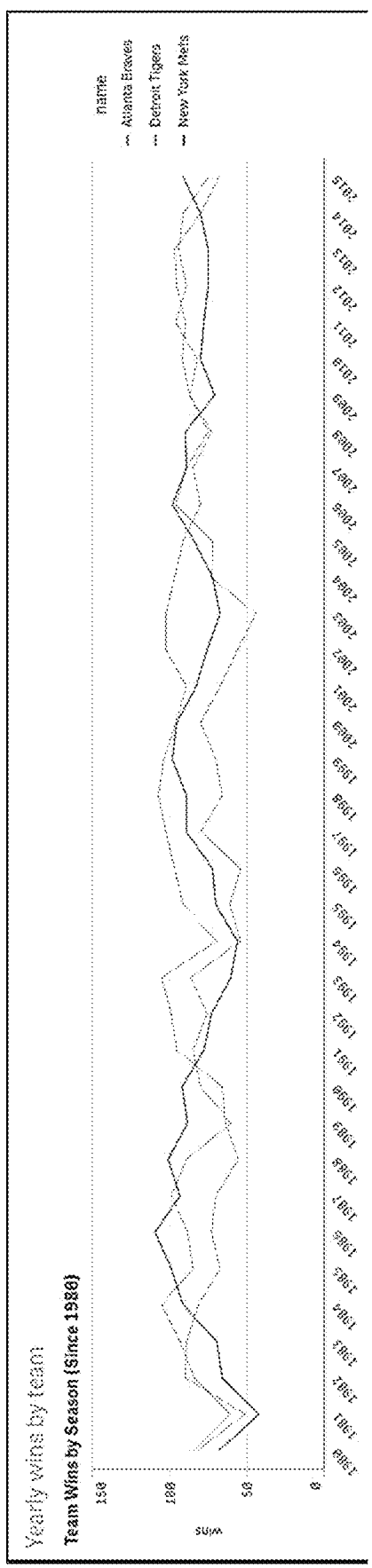
FIG. 3C depicts an example screenshot of a focused visualization.

To provide users with such a focus capability, some visualization software platforms provide users with an ability to select specific elements of the visualization. A variety of mechanisms may be utilized to provide such a selection capability (e.g., point and click selections, drop-down menus, modal dialog boxes, buttons, checkboxes, etc.). For example, with reference to FIG. 3A, a user may want to focus the visualization on a subset of specific teams. To do so, the visualization software performs the process flow of FIG. 3B. At step 300, the software receives a selection indicative of an entity corresponding to one or more of the lines of the line chart. For example, this can be a selection of three teams. Then, at step 302, the software selects the data elements within the data upon which the visualization is based that correspond(s) to the selection(s) received at step 300. Once again, continuing with the example where three teams are selected, the software would select the win totals across the subject seasons for the three selected teams. Then, at step 304, the software re-draws the line chart in a manner that limits the presented data to only the selected data elements (e.g., the lines for the selected teams. FIG. 3C depicts an example visualization that would result from step 304 after a user has selected three specific teams—the Atlanta Braves, Detroit Tigers, and New York Mets—for the focused presentation.

Inherent in this conventional approach to interactively focusing visualizations is that the user must be able to directly specify which specific elements of the visualization, and corresponding data, should be the focus of the focusing efforts, in terms of the data and metadata presented by the visualization system itself. This in turn requires that the user know which specific elements of the visualization, expressed in these terms, should be the focus in order to provide the additional information or insight he or she wishes. That means, continuing with the above example, the user needed to know in advance that the Atlanta Braves, Detroit Tigers, and New York Mets were the entities that should have been the subjects of the focus in order to yield the results he or she intended. Presumably, this would be based on knowledge possessed by the user that there was something potentially interesting about these three teams that made them worthy of focusing on them. It is believed that this constraint is a significant shortcoming of conventional focusing capabilities of data visualization systems. That is, the ability to focus a visualization on interesting aspects of the visualization via conventional software relies on either prior knowledge by the user about the specific data elements being visualized or the recognition of a specific element of the visualization itself that is worthy of focus (e.g., selecting the lines showing win peaks for teams in 1998 and 2001 that are higher than the peaks for other seasons).

For this reason, the aspects or components of data that a user may select or refer to in these visualization systems—or, in fact, any data exploration systems not involving the mechanisms described herein—are those which are already manifest within the system—specifically, those data or metadata which comprise the initial visualization with respect to which the user is making a selection (or selections), or referring, in order to produce a second visualization focusing on just those aspects or components of the data. These include such elements as specific entities or subsets of entities along the x-axis (independent variable) of a bar chart; specific measures (if there is more than one) along the y-axis (dependent variable); specific intervals along the x-axis of a line chart; specific lines in multiple-line charts; etc. In other words, the elements of the data manifest as specific entities in the system, to which a user might refer via some selection process, or in a conversational system, are limited to those which comprise the raw data or metadata initially available—e.g., those used to construct the initial visualization in the first place.

In sum, the focus criteria made available by conventional systems are criteria already known and explicitly represented within the initial data, e.g., visualization data (such as specific teams on the line chart of FIGS. 3A and 3C)—specifically, again, those data or metadata which comprise the initial data, such as visualization data, with respect to which the user is making a selection (or selections), or to which the user is referring, in order to produce a second visualization (and/or narrative) focusing on just those aspects or components of the data.

However, it is believed that there are many interesting aspects of many instances of base visualization data that are hidden within that data. Unfortunately, conventional visualization systems alone are unable to provide users with an automated means for discovering these interesting aspects of the data that are worth focusing on, and then specifying what to focus on in terms of these interesting aspects.

As a solution to this technical problem in the art, disclosed herein are example embodiments where new data structures and artificial intelligence logic can be utilized, both in conjunction with visualization systems and without, that support the use of notional specifications of focus criteria. That is, continuing with the example of FIG. 3A, rather than instructing the visualization software or narrative generation software to "Focus on Specific Team A" within the set of teams already manifest in the visualization data (by which we mean both the data being visualized and the metadata that describe those data and the visualization itself), described herein is an approach that defines the focus criteria in terms of characteristics of the visualization data that may not yet be known. By way of example with reference to FIG. 3A, this focusing criterion could be "Focus on the Team with the Highest Average Number of Wins per Season". The actual entity with the highest average number of wins per season is not known by the system ahead of time, but the applied computer technology disclosed herein allows for a notional specification of such an entity that leads to its actual identification within the visualization and narrative data, which in turn can drive a more focused visualizations or narratives.

Figure 3D:
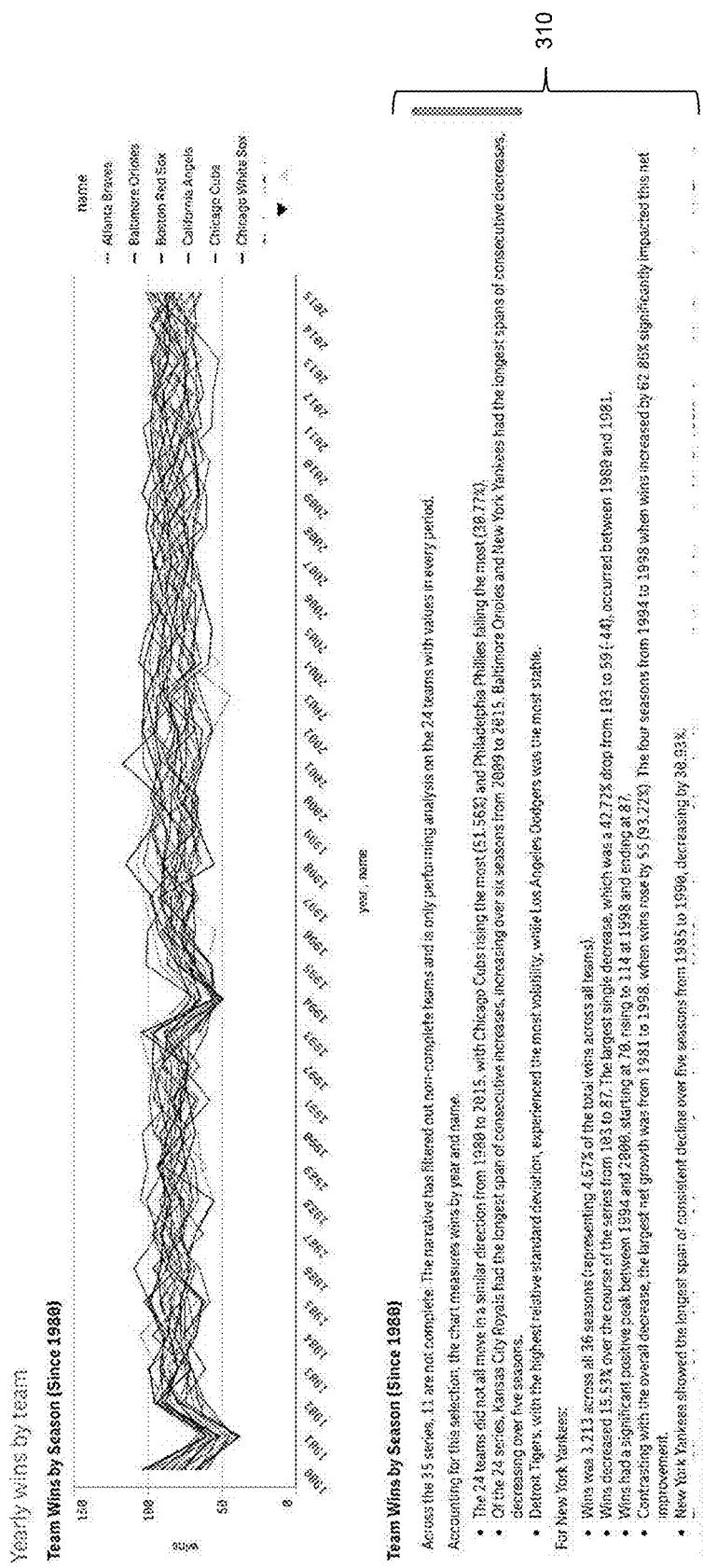
FIG. 3D depicts an example screenshot of a visualization paired with an automatically generated narrative text that explains and characterizes the visualization.

As disclosed in the above-referenced and incorporated '385 and '813 patent applications, narrative analytics can be used in combination with data, including visualization data, in order to carry out the automatic generation of narrative text that provides natural language explanations of, e.g., those visualization data. Thus, in example embodiments, captions can be automatically generated to accompany a visualization that summarize and explain the important aspects of that visualization in a natural language format. For example, FIG. 3D shows the visualization of FIG. 3A paired with a narrative 310 produced via the technology described the above-referenced and incorporated '385 patent application. This narrative 310 serves to summarize and explain important or interesting aspects of the visualization.

With the example embodiments discussed below, such narrative analytics technology can be used to generate data structures that represent notional characteristics of relevant data, such as visualization data, which in turn can be tied to specific elements of those data to support interactive focusing of narratives and/or visualizations in notional terms that correspond to interesting aspects of the data, as described above.

The operation of this narrative analytics technology applies narrative analytics to the raw data in order to produce derived features or categories (e.g., aggregate elements such as ranked lists or clusters, aggregate measures such as means, medians, ranges, or measures of volatility, and individual elements of interest such as outliers, etc.) that play a role in determining the appropriate data and characterizations—including in particular derived features, values, or categories themselves—that should be included in the resulting narrative. These narrative analytics are the analytic processes and methods specified in (or by) the system due to their potential relevance to the type of narrative the system has been constructed or configured to produce.

In regards to the issues presented by the interactive construction of more focused visualizations, it should be understood that, in light of the discussion above, the results of these analytics—which are constructed and then explicitly represented as entities within the narrative generation system—constitute entities, both notional and actual, above and beyond those representing the raw data and metadata that comprise the initial data, e.g., as associated with a visualization, themselves. Accordingly, these explicitly represented notional entities are available for presentation to users for selection (via whatever interface mechanism is preferred) as focus criteria—thereby enabling the construction and presentation of more focused visualizations (as well as more focused narratives) specified in terms of these derived features, not just in terms of the raw data and metadata comprising the initial visualization itself. These notional entities are, by the same token, available as potential referents which may play roles in queries or tasks specified by the user in a conversational interface.

Moreover, in example embodiments, the entities representing these derived features or categories can be represented (and presented to the user) in entirely notional terms—that is, they can represent objects or entities with specific, relevant properties, even if the user (or, for that matter, the system itself) doesn't yet know the actual objects or entities which have those properties. For example, if there is an analytic that computes the percentage increase in some metric over some interval, and additionally, one that ranks actual (input) entities according to this percentage increase, then it is possible to present to the user the possibility of selecting, to produce a more specific and focused visualization (and narrative), the following notional entity: "the (input) entity with the greatest percentage increase in the metric over the interval"—whether or not the user or the system knows (yet) the actual entity that fits that description. Indeed, by combining this description of the notional entity with appropriate metadata from an initial visualization or narrative (concerning, e.g., the nature of the metric and/or of the entities in question) it is possible to present the user with the option of selecting, for a more focused view and narrative: "the company with the greatest percentage increase in revenue over the third quarter." In either case, this will of course turn out to be some specific company, Company A. But the point is that the user can select or refer to this company, and the data about it, simply by selecting the notional reference described in terms of the result of this analytic, or, in a conversational system, by describing the notional reference in those terms—i.e., not solely by using the name of the company as manifest in the raw data or metadata comprising the visualization. This is the difference between being able to say, "Tell me about the three teams with the best records," and "Tell me about the Yankees, the White Sox, and the Red Sox." A user can specify the former without knowing which teams actually fit the bill—in fact the point of the resulting narrative and/or visualization will be, in part, to inform the user of which teams actually fit that description. This enables the user to focus the subsequent narrative and/or by reference to the narratively interesting aspects or components of the data, in purely functional terms.

Within this context, as an example embodiment, a narrative focus filter is disclosed that integrates narrative generation technology with visualization systems to focus on the narratively salient elements of the data, as computed by relevant analytics. The narrative focus filter simplifies a complex visualization by not only using a natural language generation system to produce an insightful narrative about the visualization, but by focusing the visualization on a subset of the data based on what is most important to the user, in narrative terms, as described above.

Further still, in an example embodiment, a narrative is embedded into an existing visualization platform. With such an example embodiment, the interface object presenting the narrative to the user of that platform can be adapted to provide an experience whereby the user is able to focus on a view of the visualization that provides him or her with the most insight. In this sense, the narrative analytics (which may be explicitly referenced or described in the narrative itself), are what actually provide the selections and filters utilized by the user to determine the focus; the system then translates these into the specific entities, e.g., as actually used by the visualization platform, that meet the appropriate criteria. The result is a seamless integration in which entities that comprise important elements of a narrative accompanying a given visualization can be used to control the subsequent narrative and/or visualization themselves. Again, these entities may be made available for selection in a graphical user interface, or, alternatively, may be available as part of the context which may serve as referents of natural language queries or task specifications by the user. Additionally, again, it should be noted that the necessary narrative analytics can be performed, and these entities can be made available for such purpose, whether or not a narrative is actually generated or supplied to the user to accompany the initial data or visualization.

The use of automatic narrative generation, or its component technologies such as narrative analytics, linked with a visualization system, can also provide other opportunities to augment a user's ability to focus a visualization, beyond the use of notional entities that may have interesting aspects as described above. In particular, such an approach can make it possible for a user to interactively investigate the drivers (causes or inputs) of particular data presented in the visualization; or to directly select specific analytics to be both presented in the visualization and utilized in constructing the accompanying narrative.

Figure 4:
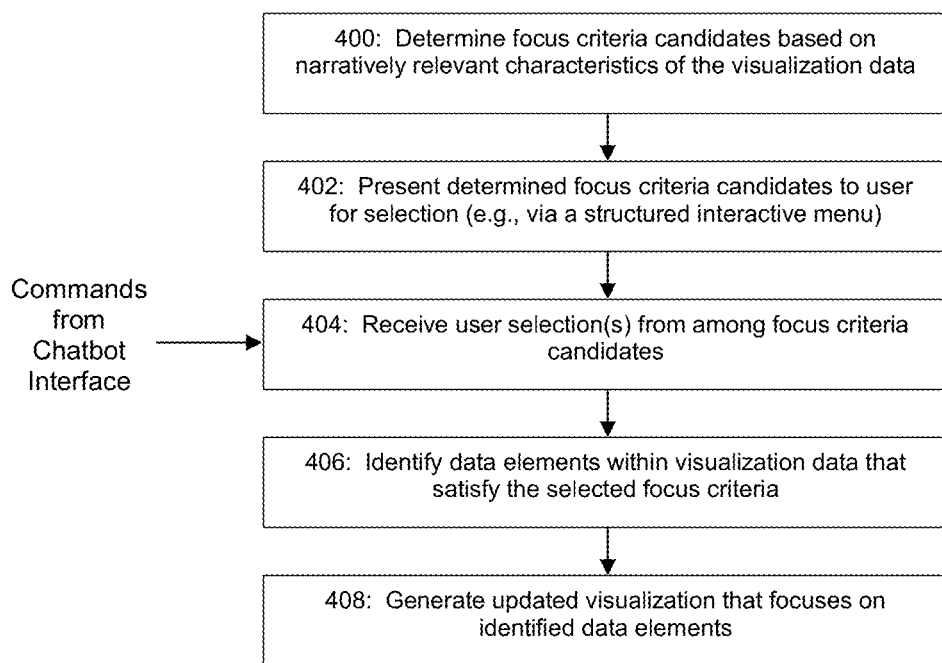
FIG. 4 depicts an example process flow for focusing visualizations with the aid of narrative analytics.
Figure 5:
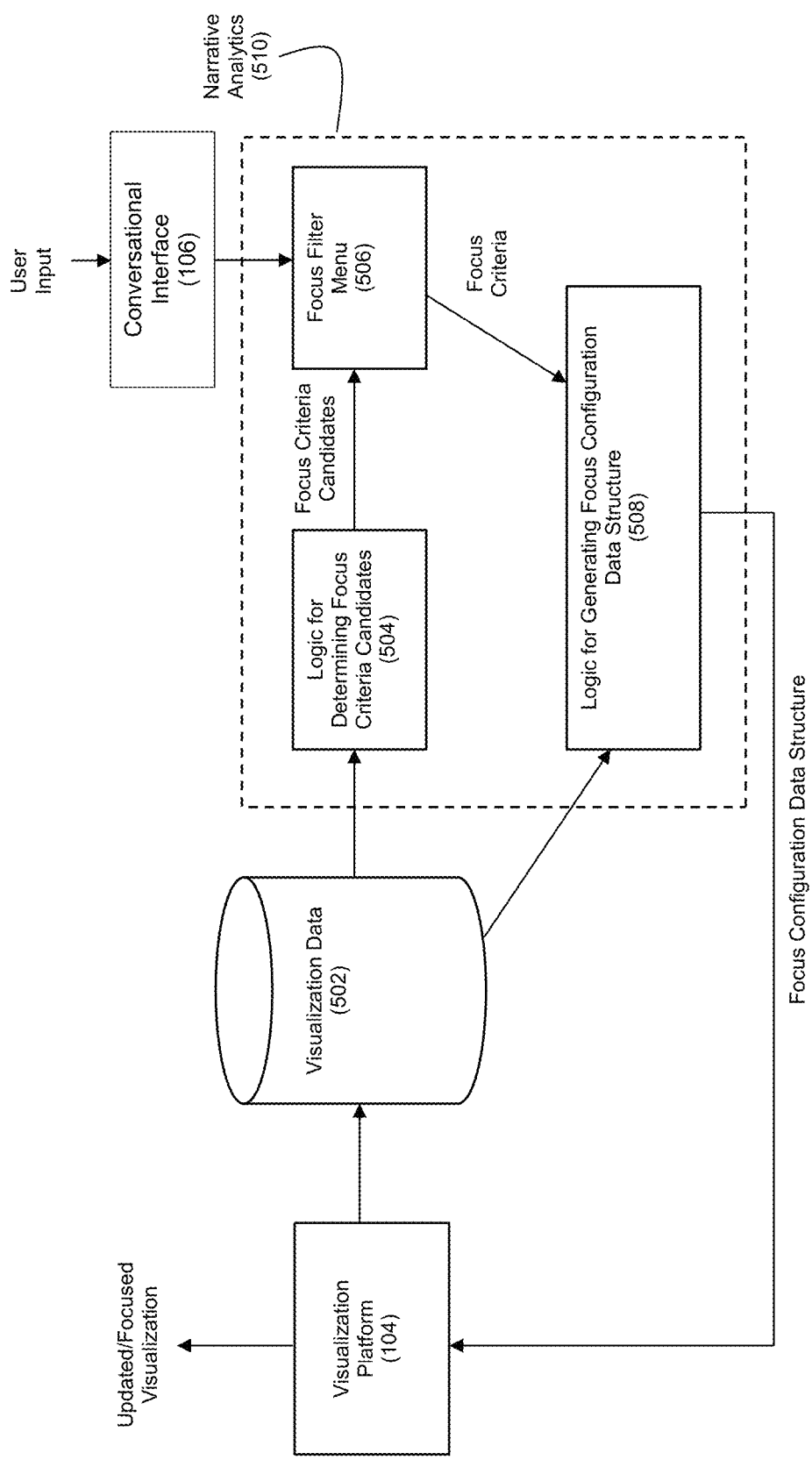
FIG. 5 depicts an example system diagram for focusing visualizations with the aid of narrative analytics.

FIG. 4 depicts an example process flow for focusing visualizations with the aid of narrative analytics. The process flow of FIG. 4 can be executed by a processor in cooperation with computer memory. For ease of illustration, FIG. 5 depicts an example system for executing the process flow of FIG. 4. The system of FIG. 5 includes a visualization platform 104 and narrative analytics 510 which may be part of the narrative generation platform 102. The visualization platform provides the visualization data 502 that serves as the source for a visualization produced by the visualization platform. The narrative analytics 510 can access this visualization data 502 through an application programming interface (API) or other suitable data access/sharing techniques. Examples of visualization platforms that may be suitable for use with the system of FIG. 5 include the Qlik visualization platform and the Tableau visualization platform. The data may also be provided directly by another application, without reference to a visualization platform.

The system of FIG. 5 may employ multiple processors such as a first processor serving as the visualization platform 104 and a second processor executing the narrative analytics 510, although this need not be the case. In an example multiple processor environment, the various processors can be resident in networked computer systems.

Figure 6:
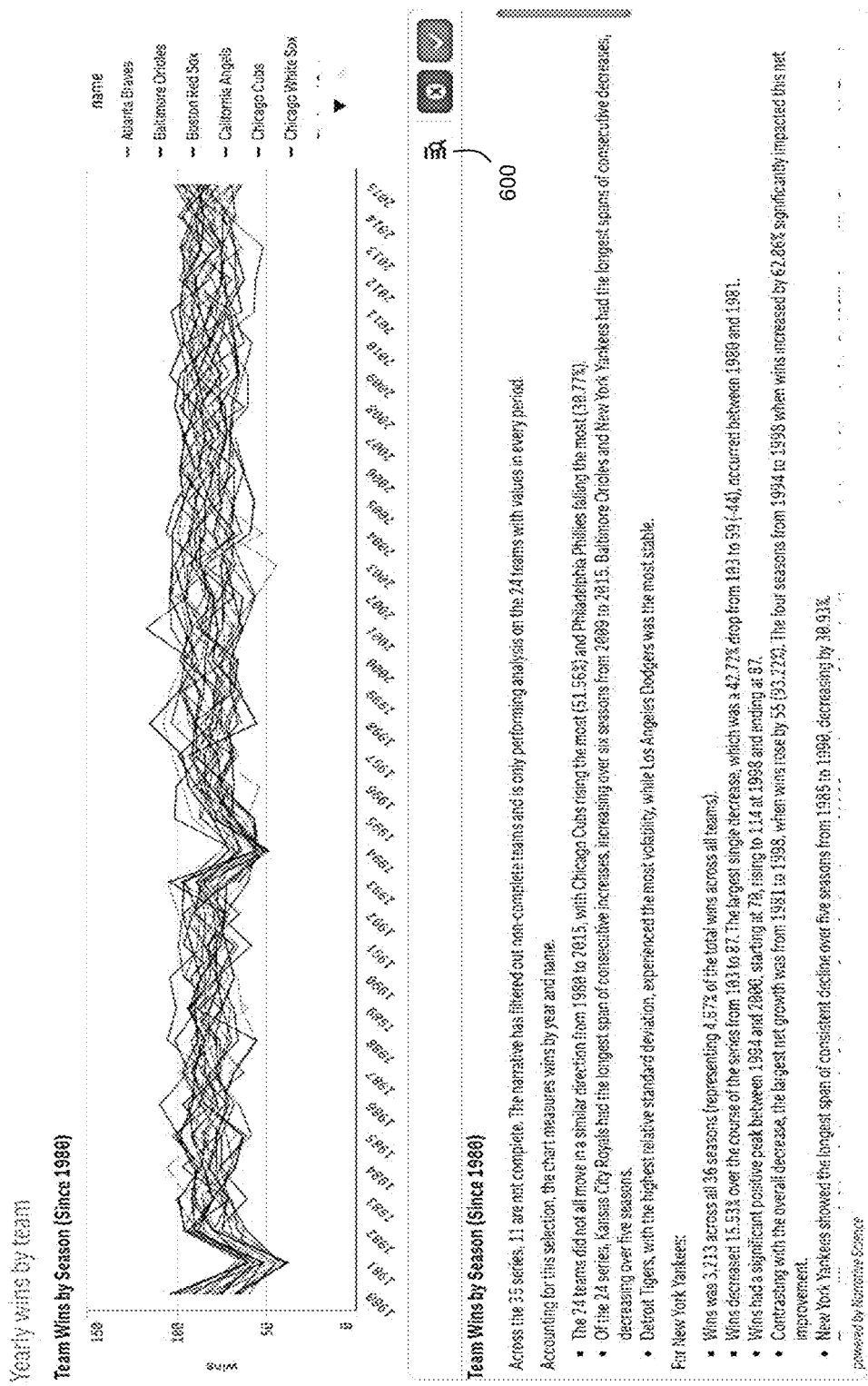
FIG. 6 depicts an example screenshot where the visualization and narrative of FIG. 3 are included with a focus filter button that is selectable by a user to initiate the process of focusing the visualization and/or narrative in a user-defined manner.

The process flow of FIG. 4 describes a technical advance in how a visualization of data can be focused around a notional entity or characteristic even though a user may be unaware of which specific aspects of the visualization correspond to that entity or characteristic. To accomplish this task, a number of new data structures and new processing logic are employed. A data structure is a physical manifestation of information organized within a computing system. Examples of data structures may include data files, records, tables, arrays, trees, objects, and the like. The process flow of FIG. 4 can be triggered in any of a number of ways. For example, as shown by FIG. 6, a "focus" button 600 or the like can be included in a visualization interface. The process flow of FIG. 4 could also be triggered by speech or text input through the conversational interface 106. In response to such triggering, the process flow of FIG. 4 can be executed.

To begin the focusing effort, the processor at step 400 determines focus criteria candidates based on narratively relevant characteristics of the visualization or other data. As shown by FIG. 5, this step can be performed by logic 504. The focus criteria candidates are options that provide the user with choices, whether implicit or explicit, regarding how the visualization is to be focused. At step 400, the system may generate a list of narratively relevant and useful notional entities, represented or described in appropriate and intuitive terms—i.e., at a higher level than those provided by the raw data or metadata themselves—for presentation to the user. Alternatively, these entities may simply be available to the system as potential referents to which natural language queries or task specifications from the user may refer. Such a list can be generated in a number of ways.

For example, under a first approach, for each type of story potentially generated by the system, or more specifically, for each set of narrative analytics utilized in each such story type, a developer or configurer can examine the set of derived features or entities that might be computed in the course of generating a story of that type. These features or entities will be represented internally by the system as variables or notional entities. The developer or configurer can then determine appropriate language for describing each of these entities to a user, and provide these terms or phrases to the system, each linked to the corresponding internal variable or notional entity, for presentation to the user via a selection mechanism (e.g., a menu) when a story of that type is generated or would be potentially relevant (typically, within this context, to accompany an initial visualization). Alternatively, again, these entities may simply be made available as possible referents within the context of these data, to be referred to within queries or task specifications uttered by the user within a conversational setting.

As another example, under a second approach, for each type of story potentially generated by the system, a separate process may traverse the configuration or code for generating a story of that type, in order to automatically determine the derived features or entities that might be computed in the course of generating a story of that type. These can be determined, for example, by examining the derivations used to compute such features by the system, which must reference them in order to provide them with specific values during analysis and story generation. Alternatively, in other implementations, they may explicitly declared as the relevant notional variables for a section of an outline or configuration representing the rhetorical structure of the story to be generated. However identified, the variables or notional entities that are used to represent those derived features or entities may then be added to the list of narratively relevant entities to be presented to the user for possible selection, or that may be available for reference as part of text or speech inputs by the user. They may be included in this list automatically; or they may be presented to a developer or configurer for inclusion on the list. The appropriate language for describing these notional entities for presentation to the user may be automatically copied from the corresponding blueprints or other data structures used to represent the linguistic expressions to be utilized by a narrative generation platform in referring to these entities in actual stories; or such language may be determined explicitly by the developer or configurer.

FIG. 7A depicts an example embodiment for step 400. At step 700 of FIG. 7A, the processor processes the visualization data to determine a visualization type, story type or set of appropriate narrative analytics corresponding to that visualization data. The above-referenced and incorporated '385 patent application describes examples of how this determination can be made. FIG. 7B depicts an example data structure for visualization data 710 in relation to the example screenshot of FIG. 6. The visualization data 710 includes not only specific data values for the data elements presented on the line charts of FIG. 6 but also metadata about those data values and the nature of the visualization itself. For example, the data and metadata may include an identification of a chart type (e.g., a line chart), a name for the measure being plotted (e.g., wins), a data array of values for the measure, names for the chart dimensions (e.g., years/seasons and teams), among other forms of data and metadata. It should be understood that this data and metadata can be organized in the data structure 710 in any of a number of formats. FIG. 7B is merely an example for the purposes of illustration. The appropriate visualization type, story type and/or set of narrative analytics can be determined at step 700 based on various fields of the data and metadata within visualization data 710. For example, the visualization data structure 710 may include metadata that identifies a chart type for the visualization (e.g., line chart) and other fields may indicate other characteristics of the chart (such as the number of entities/lines for the line chart and whether the line chart is a time series), which in turn indicate the appropriate visualization type, story type and/or set of narrative analytics.

Next, at step 702, the processor selects general focus options based on the determined story type or set of narrative analytics. The system may include data that maps visualization types or story types to general focus options to support step 702. For example, as shown by FIG. 7C, a table 720 may associate different visualization types 722 with different sets of general focus options 724. Thus, if step 700 results in a determination that the visualization type is a multi-entity line chart that includes a time series, step 702 can select the set of general focus options that are associated with this visualization type by table 720. It should be understood that while the example of FIG. 7C uses visualization type 722 as the basis for association with general focus options 724, the data structure could also use a story type or set of narrative analytics found at step 700 as the basis for selecting associated general focus options 724. Thus, by way of example, data structure 720 can associate the story type appropriate for a multi-entity line chart that includes a time series with a set of general focus options 724. Also, while FIG. 7C shows a table 720 being used for the associations with sets of general focus options, it should be understood that other techniques for association could be used, such as a rules-based approach or others.

Figure 7D:
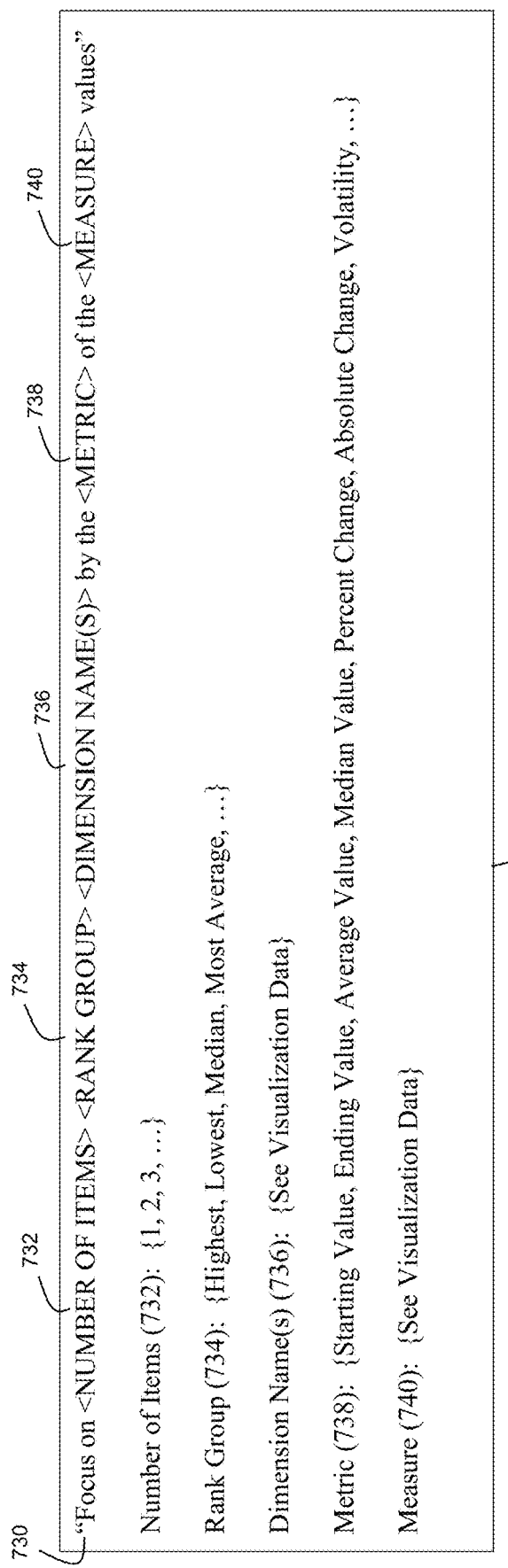
FIG. 7D depicts an example set of generalized focus options that are associated with a visualization and/or data type.

FIG. 7D depicts an example set of general focus options 724 that could be associated with a visualization type or story type such as that appropriate for or corresponding to a multi-entity time series line chart. These options 724 can be organized as a data structure that includes the following as a generalized focus expression 730: "Focus on <NUMBER OF ITEMS> <RANK GROUP> <DIMENSION NAME(S)> by the <METRIC> of the <MEASURE> values" as shown by FIG. 7D. This focus expression 730 is characterized as "general" because it has not yet been provided with specific parameters as to the features or aspects of the data or metadata that are to be the subject of the focus effort. An example of a specific focus expression corresponding to this general expression would be: "Focus on the 3 highest ranking teams by the starting value of the wins values". Another example of a specific focus expression would be "Focus on the 2 lowest ranking teams by the average value of the wins values".

The tokens in this expression (e.g., <NUMBER OF ITEMS>) are variables whose values will help specify the focus filter to ultimately be applied to the visualization or other data. These variables can be parameterized to specific values in response to user input and/or automated data processing.

The variables <NUMBER OF ITEMS> 732 and <RANK GROUP> 734 define a rank criterion for focusing and an associated volume criterion for the rank criterion for the focusing effort. The data structure 724 can include a specification of options for these variables such as the set {1, 2, 3, . . . } for the <NUMBER OF ITEMS> variable 732 and the set {Highest, Lowest, Median, Most Average, . . . } for the <RANK GROUP> variable 734. A user can then select from among these options to define specific values for these variables.

The variable <DIMENSION NAME(S)> 736 can be specifically parameterized based on the visualization data 710 that is the subject of the focusing effort. The processor can select the option(s) for this variable based on the data and metadata within the visualization data 710. For example, with respect to the example of FIG. 7B, it can be seen that the visualization data includes two dimensions—Year and Teams. These can therefore be the options that are used to determine the specific value(s) of the <DIMENSION NAME(S)> variable 736 in this instance.

Figure 7E:
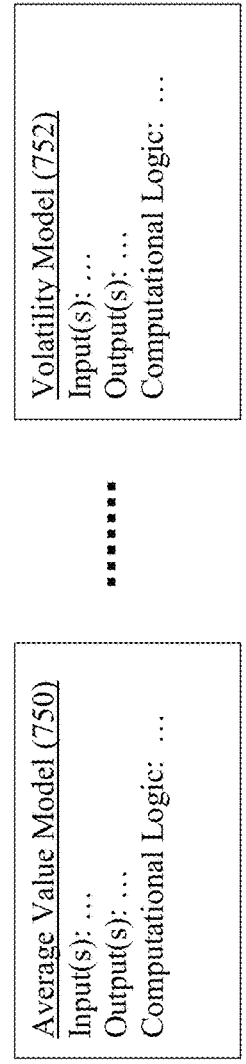
FIG. 7E depict examples of models for metric options from a set of generalized focus options.

The variable <METRIC> 738 can be used to refer to or denote a metric by which the measure values will be evaluated as part of the focusing effort. The data structure 724 can include a specification of options for the value of this metric variable such as the set {Starting Value, Ending Value, Average Value, Median Value, Percent Change, Absolute Change, Volatility, . . . }, as shown by FIG. 7D. Furthermore, each of these metrics options can be associated with a corresponding model that defines how that metric is to be computed, as shown by FIG. 7E. For example, the Average Value metric option can be associated with an Average Value Model 750 that defines how an average value will be computed in terms of various input and output parameters. Similarly, the Volatility metric option can be associated with a Volatility Model 752 that defines how volatility will be computed in terms of various input and output parameters. It should be understood that some metric options may be assumed by default to apply to certain elements of the time series (e.g., the Percent Change metric being computed by default as the percent change between the first and last measure of the time series). However, if desired, a practitioner could include additional features whereby a user or automated process can further define constraints on which elements of the time series for which (or over which) metrics such as "percent change", "absolute change", etc., are to be computed (e.g., a user-defined time span).

The variable <MEASURE> 740 can be parameterized based on the visualization or other data 710 that are the subject of the focusing effort. The processor can select the measure based on the data and metadata within the visualization data 710. For example, with respect to the example of FIG. 7B, it can be seen that the visualization data includes "wins" as the measure, and this measure can therefore be used as the value for the <MEASURE> variable 740.

Returning to the process flow of FIG. 7A, at step 704, the processor specifies the focus options variables that are defined as a function of the visualization data. For example, at step 704, the processor parses the visualization data 710 to select the options for the <DIMENSION NAME(S)> variable 736 and the identity of the <MEASURE> variable 740 as discussed above. However, it should be understood that in other embodiments, more or fewer variables could be defined as a function of the visualization data. For example, the set of options for the value of the <NUMBER OF ITEMS> variable 732 need not be a predefined list as shown by FIG. 7D and could instead be defined dynamically as a function of a count of how many dimension elements are present in the visualization data (e.g., a count of the number of teams in the example of FIG. 7B).

At the conclusion of step 704, the processor has a defined set of focus criteria candidates to use as part of the focusing effort. Returning to FIGS. 4 and 5, the processor can next present the determined focus criteria candidates to a user for selection (step 402). By way of example, this presentation can occur through a focus filter menu 506 as shown by FIG. 5. This focus filter menu 506 can be a structured interactive menu that includes a plurality of fields through which a user can choose from among the various options for various focus variables.

Figure 8A:
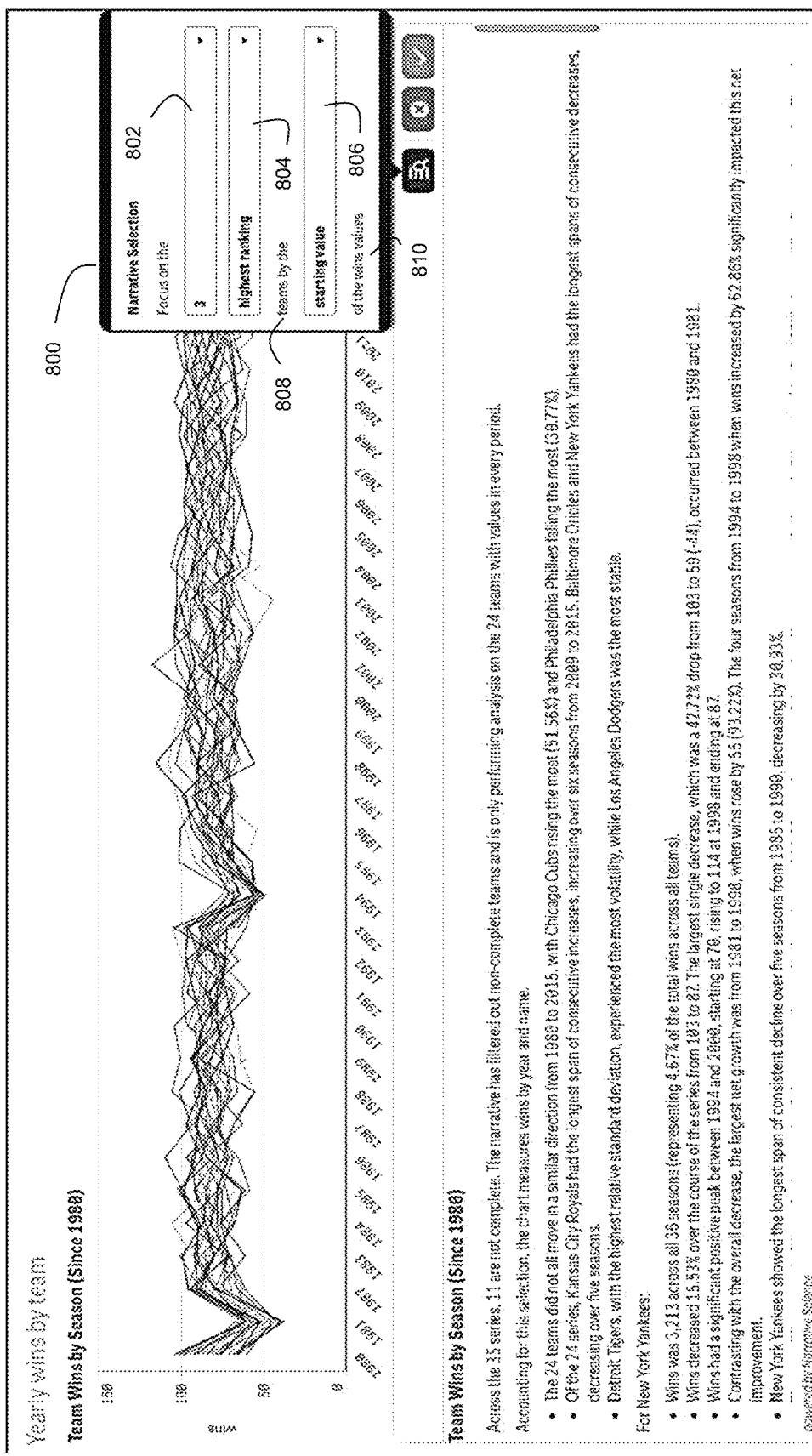
FIG. 8A depicts an example screenshot where the visualization that includes a focus filter menu.
Figure 8B:
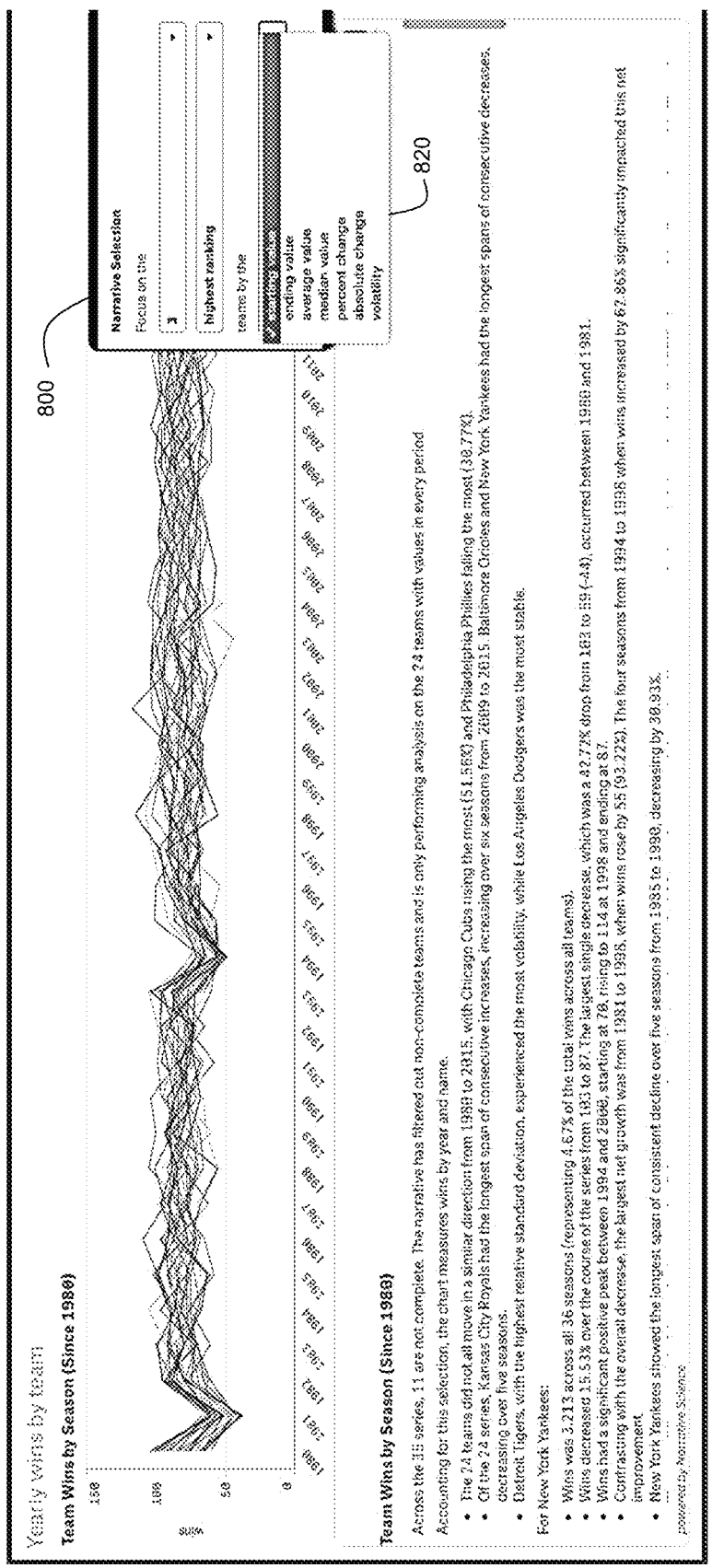
FIG. 8B depicts an example screenshot where the visualization that includes a focus filter menu where the focus filter menu includes a drop down menu of focus options.

Alternatively, the menu can be presented via narrative text (or computer-generated speech) via a GUI and/or conversational interface 106. FIG. 8A shows an example focus filter menu 800 where the menu includes fields 802, 804, and 806 through which a user can define the values to be used for the <NUMBER OF ITEMS> variable 732, <RANK GROUP> variable 734, and <METRIC> variable 738 respectively. FIG. 8B shows how drop down menus (see 820) can be included with the focus filter menu 800 to provide the user with a list of the available options for the value of each variable determined as a result of the process flow of FIG. 7. The available options may also simply be made available within the context of the interaction as possible criteria to which the user may refer in natural language queries or task specifications.

At step 404, the processor receives input from the conversational interface 106 that represents a natural language command from a user. For ease of reference, the term "command" as used herein refers to either or both declarative commands (e.g., "Tell me who the best salesperson is") and questions/queries (e.g., "Who is the best salesperson?"). The conversational interface 106 may receive this input as speech or text from the user. This input defines selections for the focus criteria candidates available through menu 506. The system now has a specific set of focus criteria to use for its focusing effort. FIG. 8C shows an example data structure that contains the focus criteria defined in response to the user input at step 404. The example focus criteria data structure 830 expresses a focus statement of "Focus on the 3 highest ranking teams by the starting value of the wins values". It should be understood that other formats could be used for the focus criteria data structure if desired by a practitioner.

At step 406, the processor uses the focus criteria in combination with the visualization or other data to identify data and metadata elements within the visualization or other data that satisfy the focus criteria. Logic 508 shown by FIG. 5 can perform this step. For step 406, the narratively relevant notional entities (derived features or entities) are computed in specific terms of the case at hand—i.e., the actual entities filling those roles are determined. For instance, in an example concerning volatility, the level of volatility is assessed for each of the series displayed in the visualization; and then the (in this case) three series with the highest level of volatility are identified in the specific terms utilized by the visualization system or in the underlying data (e.g., via the metadata labels denoting these specific entities). These computations may already have been performed by the narrative generation system, or they may be performed on demand when the user selects or refers to the notional entity or entities in question to focus on. These computations in a sense carry out a "translation" process, in which a selection by the user of entities expressed in narratively relevant notional terms (or criteria) is transformed into a selection in terms recognizable by the visualization platform itself, i.e., from among the elements of the raw data or meta-data comprising the current visualization or from other available data.

FIG. 9 shows an example process flow for this logic 508. At step 900 of FIG. 9, the processor instantiates data structures and code for computing the derived features needed for (or specified by) the focus criteria. Continuing with the previous example of visualization data, if the focus criteria involved finding the 3 teams with the highest volatility in win totals, step 900 can include instantiating data and code for computing the win totals volatility for each team in the visualization data, which would include accessing Volatility Model 752 and mapping the input parameter(s) for the volatility model to specific data elements of the visualization or other data (e.g., the wins data array) and mapping the output parameter(s) for the volatility model to data structures that hold volatility values. Next, at step 902, the processor computes the necessary data components for the focus criteria based on the instantiated data structures and code. Continuing with the example, at step 902, the processor would use the instantiated volatility model 752 to compute a volatility value for each team in the visualization data. Then, at step 904, the processor applies other focus criteria to the computed data components to determine a focus configuration to use for the focusing effort. For example, if the focus criteria specified finding the 3 teams with the highest volatility in win totals, step 904 would operate to sort or rank the computed volatility values for each team and then select the 3 teams with the highest volatility values. The result of step 904 would thus be a focus configuration data structure that identifies the specific elements within the visualization or other data that satisfy the focus criteria. FIG. 9B shows an example of such a focus configuration data structure 910. In the example of FIG. 9B, the focus criteria was "Focus on the 3 highest ranking teams by the starting value of the wins values". It can be seen in FIG. 9B that the operation of the process flow of FIG. 9A resulted in the identification of the "Baltimore Orioles", "Kansas City Royals", and "New York Yankees" as the teams that satisfied these focus criteria.

Figure 10:
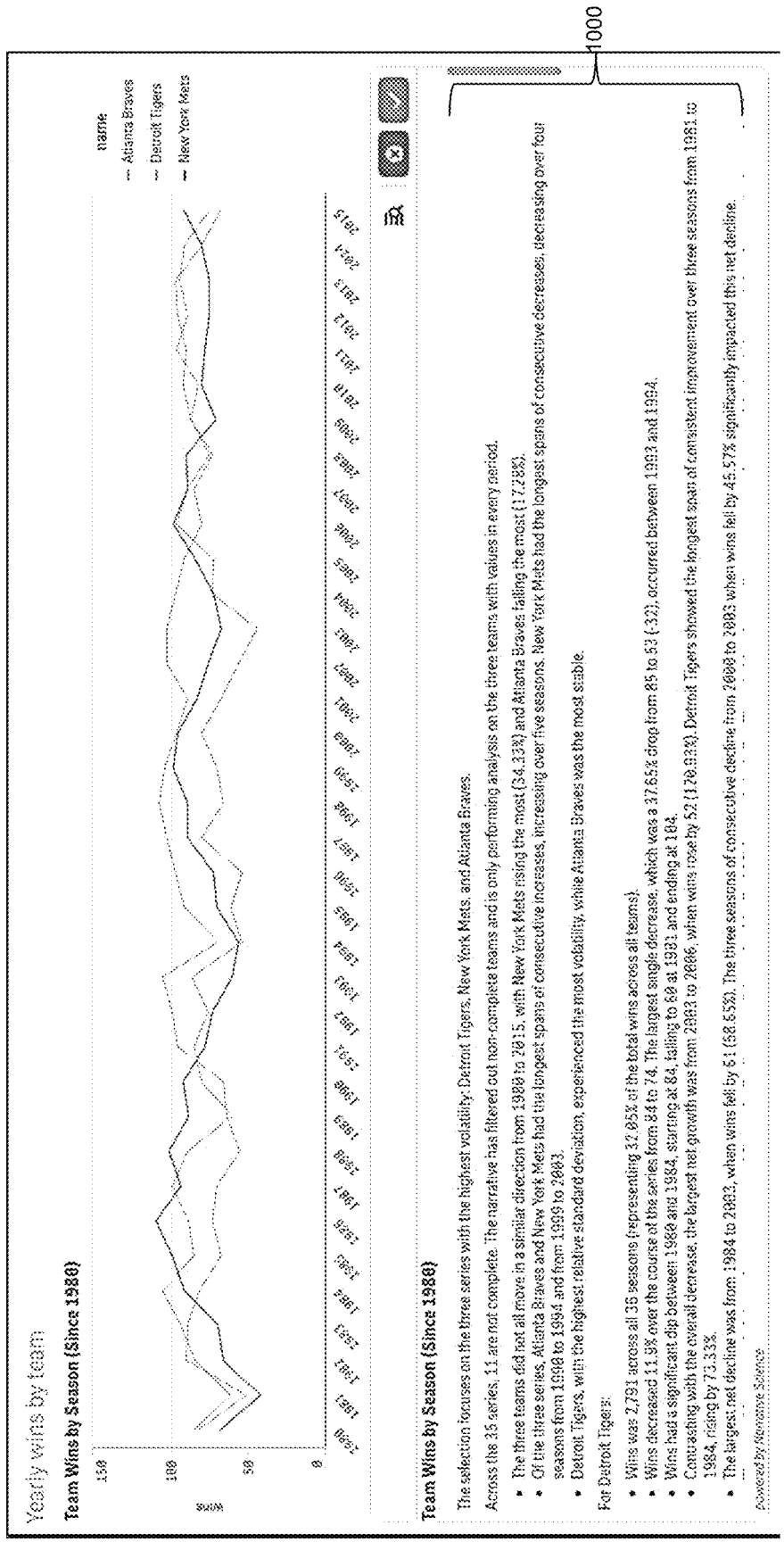
FIG. 10 depicts an example screenshot showing a visualization that has been focused based on input received through a focus filter menu.

Using such focus configuration data, a call can be made to the visualization platform via a selection API of the visualization platform. When that call and the focus configuration data are received, the visualization platform triggers the selection defined in the focus configuration data and the visualization is updated to reflect the selection of the focused entities via mechanisms within the visualization platform itself (step 408). FIG. 10 depicts an example screenshot showing how the visualization of FIG. 1 can be focused on the three teams that exhibited the highest volatility in win totals. Similarly, the narrative generation engine can be invoked with respect to such focus configuration data and the selected focus entities.

Thus, in contrast to conventional visualization focusing techniques, example embodiments for focus and control as described herein use innovative new data structures and associated processing logic as discussed above to provide users with a capability to specify focus criteria in entirely notional terms without a requirement that the specific focus criteria be known in advance. The processing logic leverages these new data structures to translate the notional specification of focus criteria into specific components of visualization or other data that are to be the subject of the focusing effort. This is a significant improvement over conventional visualization or other data exploration focusing technology that requires a user to select specific existing elements of a visualization or data set as the subjects of the focusing effort (e.g., selecting a specific line or team on the chart shown by FIG. 3A).

C(1). Focused Visualizations and Focused Narratives:

The focus criteria, focus configuration data, and/or focused visualization or other data can also be used to automatically generate a focused narrative. This narrative can be paired with the focused visualization. FIG. 10 shows an example of such a focused narrative 1000. FIG. 11A shows an example process flow that corresponds to the process flow of FIG. 4 with an added step for invoking a narrative generation platform to generate the focused narrative (step 1110). While FIG. 11A shows step 1150 occurring after the focused visualization is generated, it should be understood that step 1150 is separate and could occur before the focused visualization is generated and/or be performed in parallel with the FIG. 4 process flow. The above-referenced and incorporated '385 patent application describes technology regarding how narrative analytics can be used to automatically generate narrative texts that summarize and explain visualizations. The narrative generation technology described in the above-referenced and incorporated '385 patent application can be extended to leverage the focusing efforts to also provide an appropriately focused narrative that can accompany the focused visualization.

As described earlier, the narrative generation platform 102 that performs step 1150 can be a highly flexible platform capable of generating multiple types of narrative stories using a common platform that operates on parameterized story configurations (examples of which are described in several of the above-referenced and incorporated patents and patent applications). However, it should be understood that the narrative generation platform need not necessarily employ such a modular and flexible approach to narrative generation. For example, as discussed in the above-referenced and incorporated '385 patent application, the narrative generation platform may include a number of separate software programs that are coded to generate specific types of stories, and the process flow of FIG. 11A can decide which of these software programs will be used to generate a story with respect to a given visualization type/story type under consideration for the focusing effort. That being said, it is believed that the use of a highly modular and parameterized narrative generation platform in combination with focusing efforts will be particularly adept and robust when generating focused narrative text that explains a focused visualization in greater detail. As such, the descriptions below will elaborate on step 1150 where a specific story type is expressed, using some specification language, as a configuration for a configurable narrative generation platform or engine, which can then produce narratives of the appropriate type as specified by that configuration.

Figure 11B:
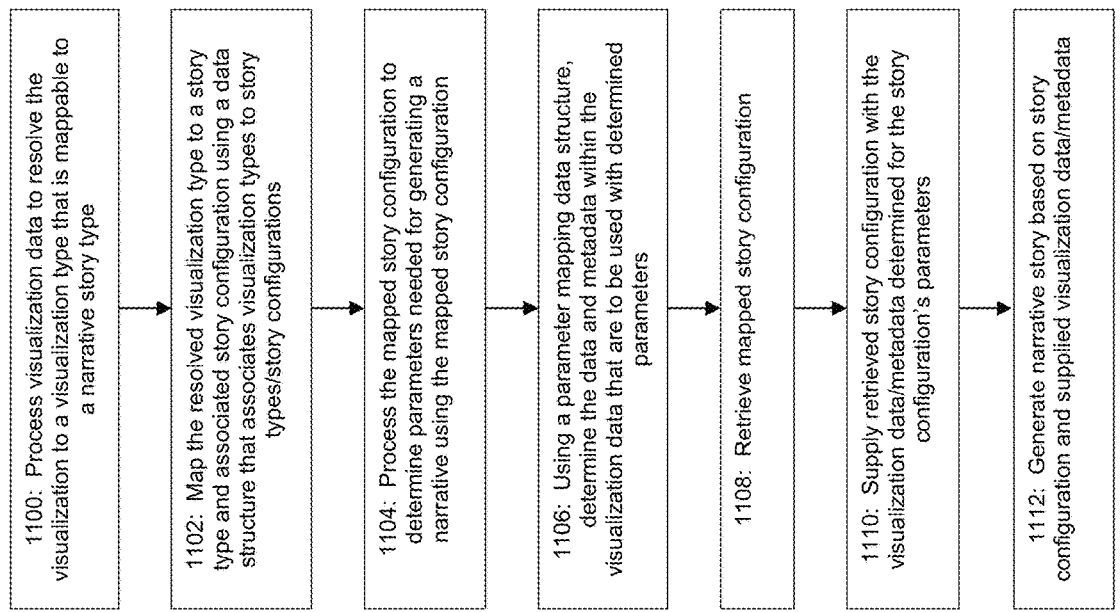

Focused narrative generation can be triggered in any of a number of ways. For example, the focused narrative generation can use focused visualization data that is provided by the visualization platform in response to its processing of the focus configuration data (see the example process flow of FIG. 11B whose operation is described in greater detail in the above-referenced and incorporated '385 patent application and where step 1100 uses the focused visualization data as its starting point). As another example, if the focusing operation involved mapping a visualization to a story configuration for a narrative generation system, this mapped story configuration can be used as the starting point for narrative generation (see FIG. 11C). Under this approach, the narrative generation system can be directly invoked with the appropriate data and metadata, as determined by the focus configuration, in parallel with those data and metadata being supplied to the visualization system to produce a focused visualization if desired. Under either exemplary approach, since the type of data and metadata, including the type of the visualization, remain the same, the same story type can be utilized in generating the focused narrative as was utilized in generating the original narrative, except now parameterized with appropriately restricted data, as described in the above-referenced and incorporated '385 patent application.

Thus, it can be seen that the narrative analytics technology described herein can be used to generate focused visualizations and/or focused narratives that are responsive to a user's notional specification of focus criteria as received via a conversational interface 106. For example, a first practitioner might find it desirable to use the disclosed narrative generation technology to generate focused visualizations without any pairing with a focused narrative to accompany the focused visualization, while a second practitioner might find it desirable to use the disclosed narrative generation technology to generate both a focused visualizations and a focused narrative that accompanies the focused visualization. Still further, a third practitioner might find it desirable to use the disclosed narrative generation technology to generate a focused narrative that accompanies a visualization but where the visualization itself is not updated in a focused manner. Also, a fourth practitioner may decide to use the disclosed narrative generation technology to generate a focused narrative without any accompanying visualization.

C(2). Driver Evaluation as the Interaction with a Visualization:

In additional example embodiments, the system can support driver evaluation when a user interacts with a visualization. As explained in the above-referenced and incorporated U.S. Pat. No. 9,576,009, many measures depicted by data visualizations exhibit values that are driven by other measures, e.g., the values of which may be determined by these other measures. These other measures can be referred to as "drivers". For example, "drivers" for a revenue measure may include measures such as "units sold" and "price per unit". The inventors believe that there is a need in the art for technology that uses drivers as the criteria by which to focus a narrative that accompanies a visualization of data.

Figure 12:
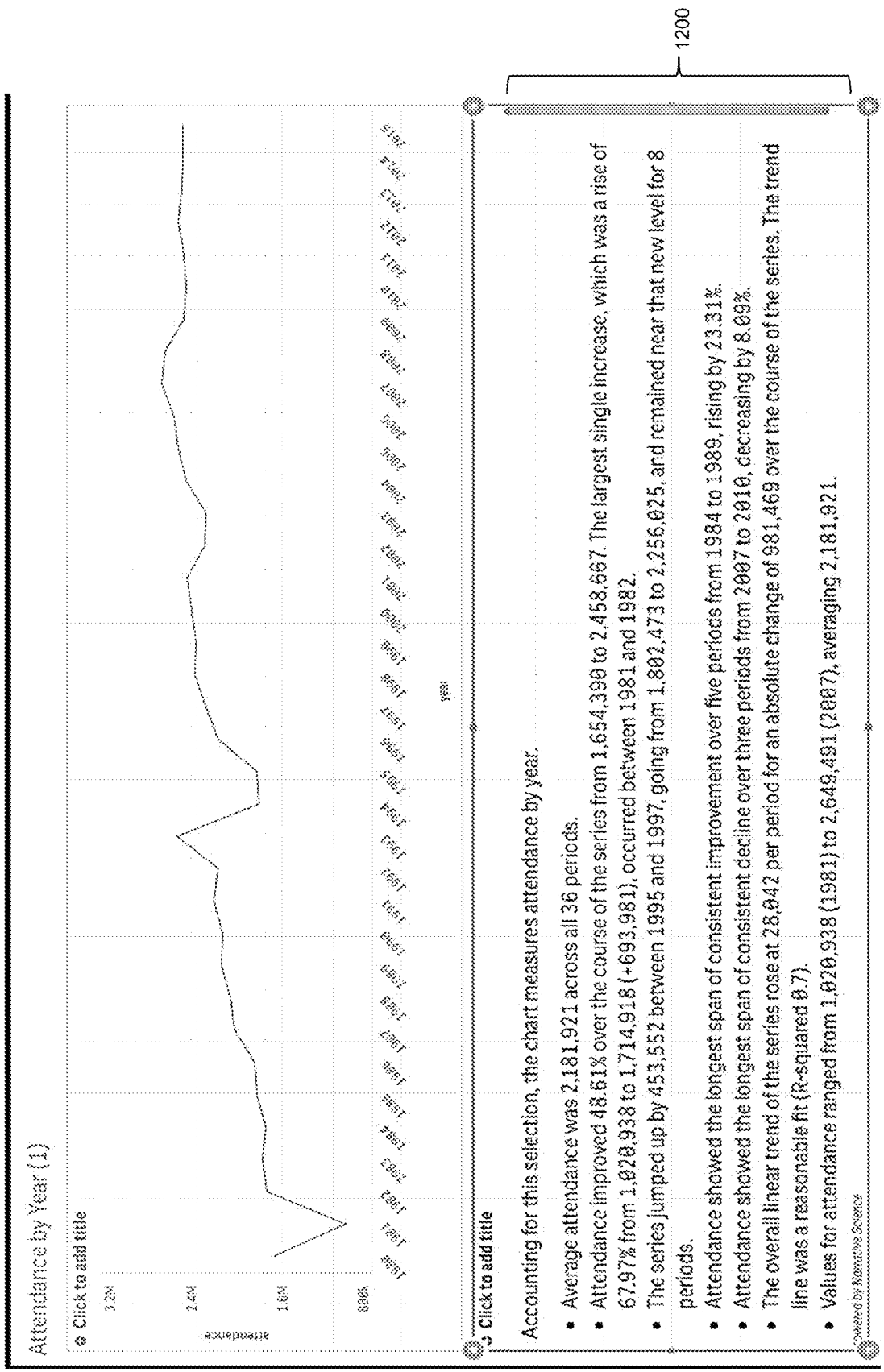
FIG. 12 depicts another example screenshot of a visualization generated from a set of visualization data.

FIG. 12 depicts an example visualization that includes a line chart showing the average attendance for major league baseball teams for each season from 1980 through 2015. The example screenshot of FIG. 12 also includes narrative text 1200 that accompanies the visualization. This narrative text, which can be automatically generated via the technology disclosed in the above-referenced and incorporated '385 patent application, explains and summarizes various aspects of the average attendance line chart. It is believed that there is a strong need in the art for tools that would help users evaluate potential drivers of the measure shown by the line chart, or of other types of visualizations. In the context of the example of FIG. 12, what drivers may influence average attendance at major league baseball games? Is it home runs (where more home runs might be hypothesized to lead to more fan excitement which leads to improved attendance)? Is it the number of hits (under a similar assumption as home runs but where hits are perhaps not deemed as exciting by fans as home runs)? Some other driver?

To support the evaluation of potential drivers as focus criteria, the system can leverage a larger ecosystem of data. In an example embodiment, the user can select one or more measures that could potentially drive the performance of a given subject measure in a visualization. The measures selected as potential drivers can be data or metadata that are manifest within the visualization system and/or narrative analytics system but that are not necessarily reflected in the source visualization data used for the subject visualization presented to the user. An example of this can be seen in FIG. 13.

Figure 13:
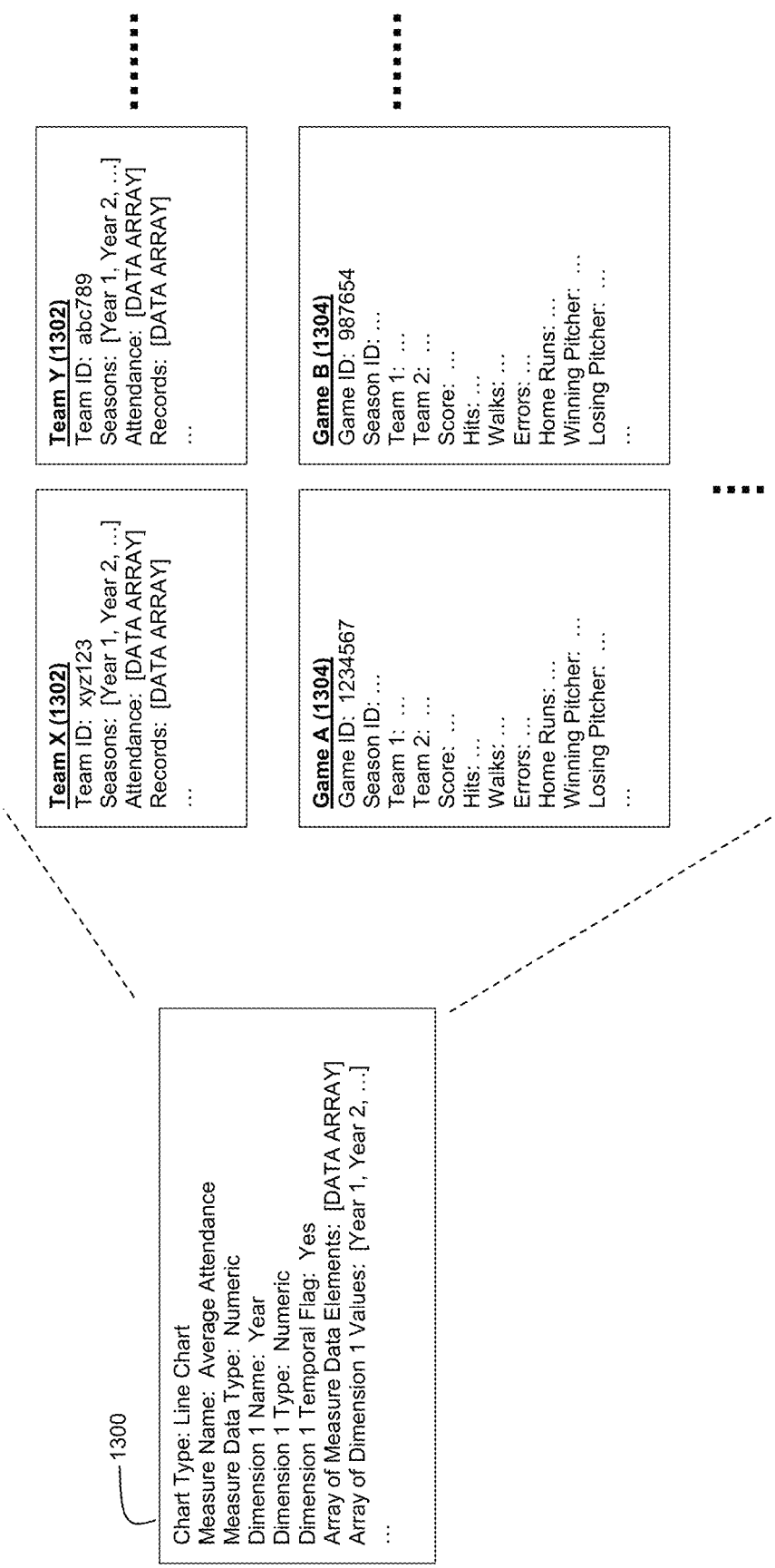
FIG. 13 depicts an example data ecosystem that shows relationships that exist between visualization data and other data stored in a system.

FIG. 13 shows example visualization data 1300 that corresponds to the visualization seen in FIG. 12. This visualization data 1300 can live within a larger data ecosystem where other data structures and data elements stored in the system memory for either or both the visualization platform and narrative analytics are associated in some manner with data elements of the visualization data 1300. For example, the visualization data 1300 may live within a larger ecosystem of baseball data with data structures 1302 for various teams, data structures 1304 for various games, etc. Each data structure 1302, 1304 may include data elements that describe the teams and games. The data elements within this data ecosystem may serve as potential drivers for the visualization data's subject measure (in this case, average attendance).

Figure 14:
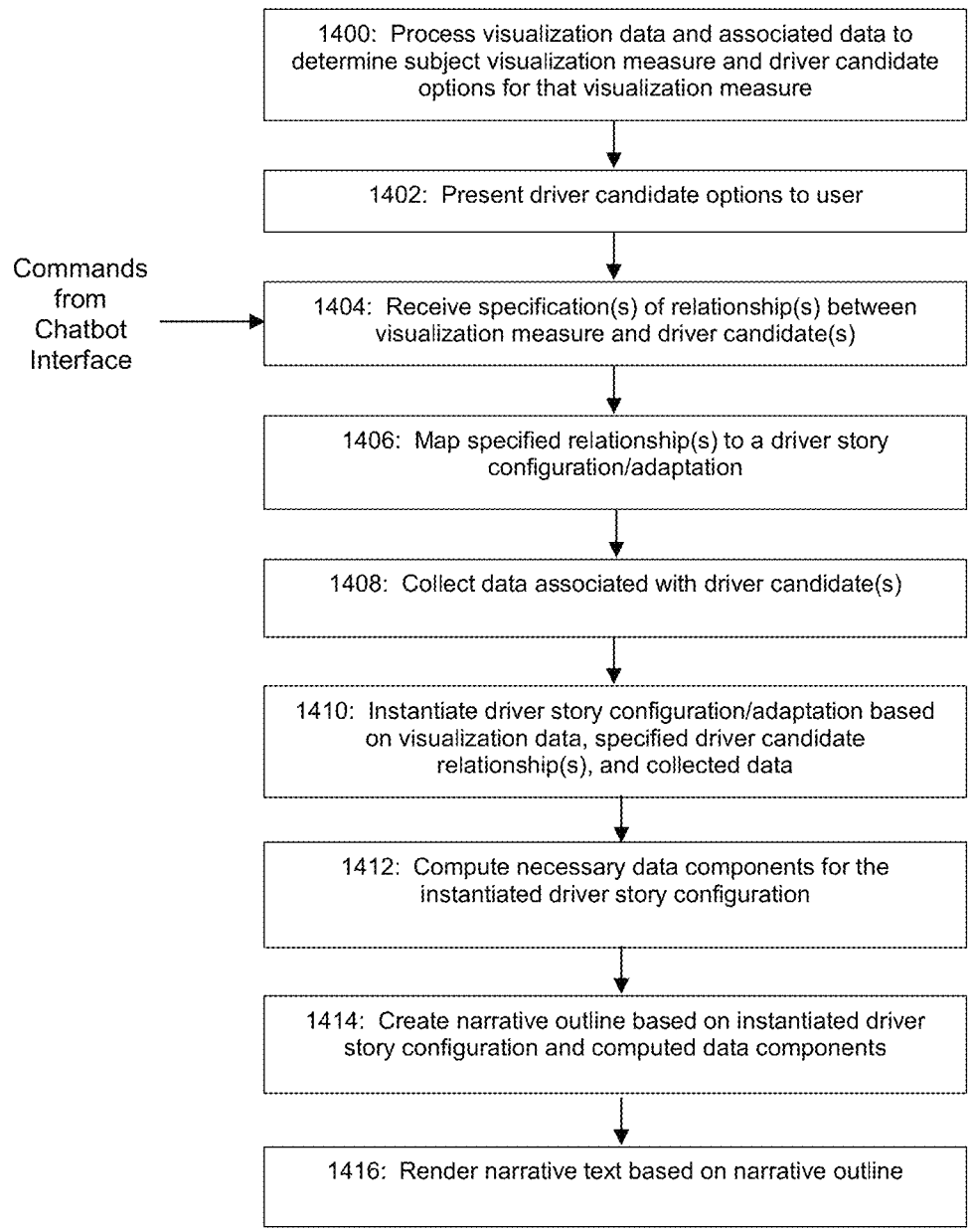
FIG. 14 depicts an example process flow for evaluating potential drivers with respect to a measure shown by a visualization.

FIG. 14 shows an example process flow for evaluating potential drivers with respect to a measure shown by a visualization in order to generate a visualization narrative that is focused on the potential drivers.

At step 1400, a processor processes the visualization data and associated data within the data ecosystem to determine the subject visualization measure and driver candidate options for that visualization measure. This step can be performed by first extracting the subject visualization measure from the visualization data and then by selecting the data elements within the ecosystem that bear some form of a relationship with the subject measure. For example, as shown in FIG. 13, "Average Attendance" can be selected as the subject visualization measure, and data elements such as "Hits", "Walks", Home Runs", and others may be selected as driver candidate options at step 1400. In an example embodiment, an extension can query the visualization platform for all the other measures currently manifest within the memory of the application. This results in a set of possible "outside measures". The names of these measures will be what the user sees in the user interface when selecting driver options. The raw data values of these measures will be used when performing regression analysis to assess the nature of the relationship between the potential driver and the visualization measure. FIG. 17A shows an example array that could represent a driver for evaluation (or set of possible drivers if multiple drivers were specified).

Figure 15A:
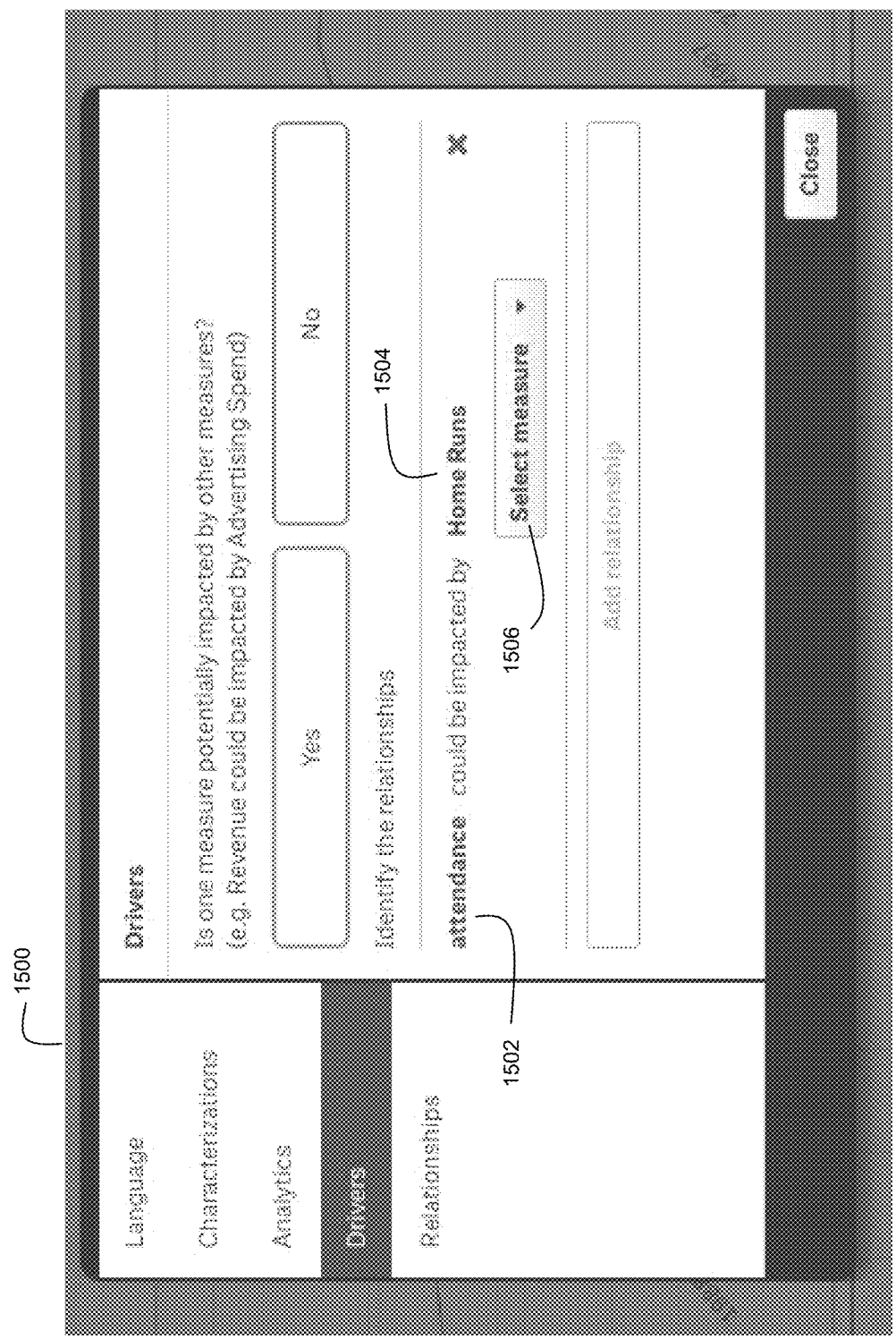
FIG. 15A depicts an example menu for specifying a relationship between a visualization measure and a driver candidate to be evaluated.

At step 1402, the selected driver candidate options are presented to a user. FIG. 15A shows an example of how this step can be performed. A user interface menu can be presented on a user computer, and this interface can be configured to guide the user toward defining a driver candidate 1504 for a subject measure 1502. A button 1506 can be provided that responds to user selection by presenting a drop down menu or the like that lists the driver candidate options selected at step 1400. From this list, a user can select which of the driver candidate options are to be used as driver candidates in generating the accompanying narrative. Alternatively, the menu of choices can be presented via narrative text (or computer-generated speech) via a GUI and/or conversational interface 106. Moreover, these options may not be explicitly presented to the user at all, but simply be available for reference by the user within the context of a conversational interaction.

Figure 16A:
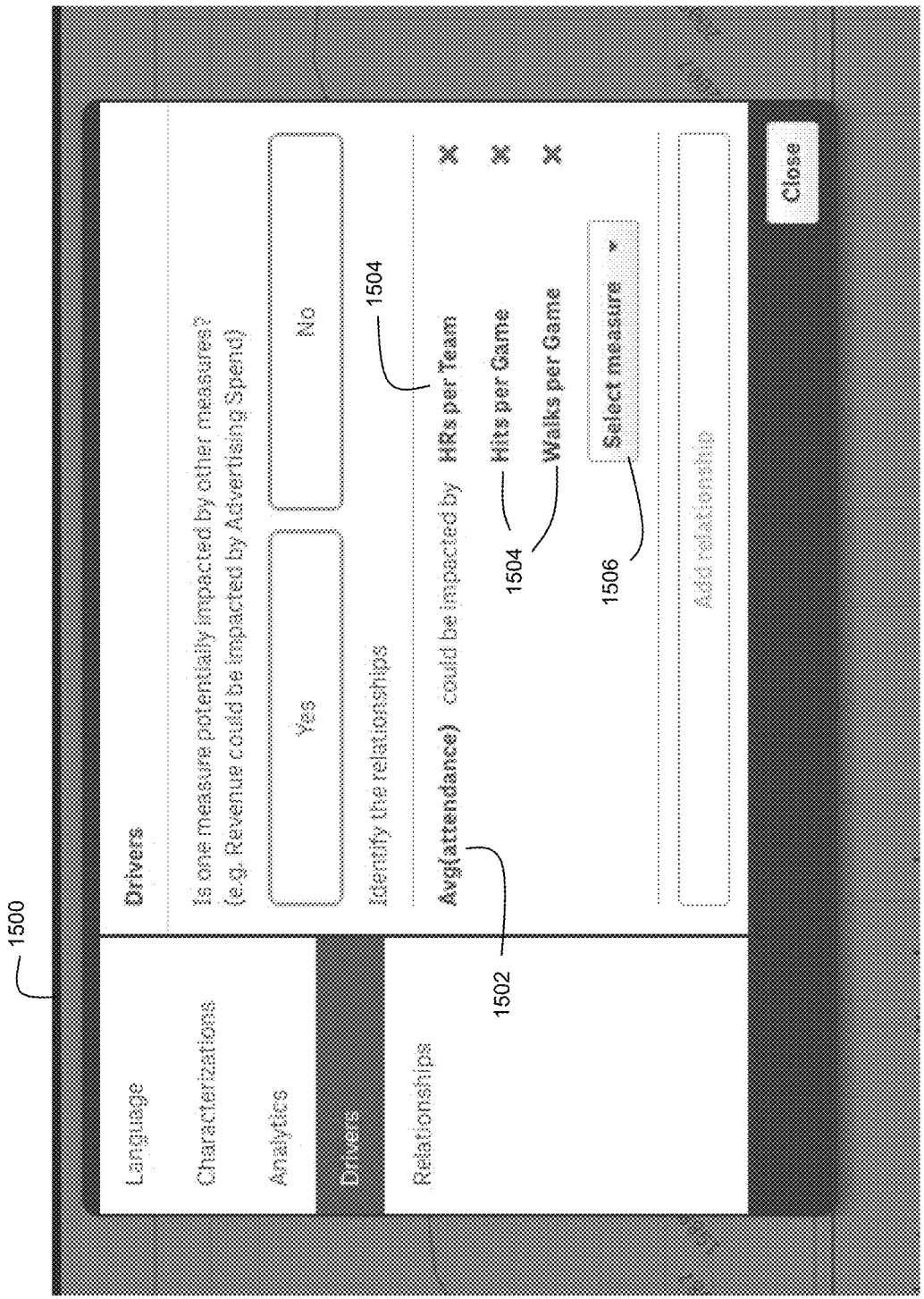
FIG. 16A depicts an example menu for specifying a multiple relationships between a visualization measure and multiple driver candidates to be evaluated.

At step 1404, the processor receives input from the conversational interface 106 that represents a natural language command from a user. This input can be in either text or speech form. As mentioned above, the term "command" as used herein refers to either or both declarative commands and questions/queries. This input specifies a relationship between the subject visualization measure and a driver candidate. In the example of FIG. 15A, the user has selected "Home Runs" as the driver candidate, which specifies a relationship where "Average Attendance" could be impacted by "Home Runs". FIG. 16A shows another example user interface menu where multiple driver relationships have been specified.

At step 1406, the processor maps the specified driver relationship(s) to a driver story configuration within the narrative analytics system. For example, the specified driver relationship(s) may be mapped to an "Evaluate Driver" story configuration. This story configuration can include a specification of processing logic that is executable to perform linear regression(s) of the independent variable(s) (the selected driver candidate(s)) versus the dependent variable (the subject visualization measure) in order to quantify a potential correlation between the driver candidate(s) and the subject visualization measure, as well as characterization logic (angles) that assess the results of these correlations in narrative terms to be included in the final result. Also, as mentioned above, in an embodiment where the narrative generation platform employs special-purpose, story type-specific adaptations of the narrative generation software rather than a configurable general purpose platform, it should be understood that step 1406 may operate to map the specified driver relationship to the appropriate special-purpose narrative generation adaptation rather than to a story configuration.

At step 1408, the processor collects data associated with the driver candidate(s). This data collection can be referred to as an "outside series". The "outside series" data are kept distinct and treated differently from the subject measure because the visualization and accompanying narrative are still focused on the subject measure. The additional data from these outside series can be used for regression analysis when evaluating potential driver status, but may not necessarily comprise a major focus of the narrative. FIG. 17B shows an example "outside series" data structure.

Steps 1410 through 1416 then operate to render narrative text from a story configuration as described in connection with the above-referenced and incorporated patents and patent applications.

At step 1410, the process instantiates the driver story configuration based on the visualization data and the specified drive candidate relationship(s) (using technology as described in the above-referenced and incorporated '385 patent application and the other above-referenced and incorporated patents and patent applications).

Then, at step 1412, the processor computes the necessary data components for the instantiated driver story configuration. Continuing with the example where the driver story configuration is geared around evaluating how average attendance could be impacted by home runs, this step may include computing the number of home runs for each seasons and computing linear regression parameters for use in assessing the potential influence of each season's home run totals on each season's average attendance. This regression analysis uses the raw values of the subject measure (e.g., average attendance) against the raw values of any of the driver candidates (e.g., see FIG. 17B). The regression analytic looks, first, to assess the overall relationship between all of the driver candidates against the subject measure.

At step 1414, the processor creates an instantiated narrative outline based on the instantiated driver story configuration and the computed data components. This step may include evaluating various angles that may be included in the driver story configuration (such as angles that assess whether a given characterization of the driver candidate is accurate—e.g., an angle corresponding to a "strong relationship between driver and measure" that tests whether the correlation between the measure and driver is above a threshold based on the computed data components; and similar angles corresponding to weak or medium relationships, etc.). In an example drawn from FIG. 16A, this outline is defined by the driver story configuration and may exhibit a structure such as a first sentence in a section pertaining to drivers that explains an overall summary of the driver analysis. Subsequent parts of the section pertaining to drivers can then explain which of the driver candidates had the strongest relationship to the subject measure and provide supporting evidence. Still further, other portions of the section pertaining to drivers can call out other results of the calculations that may be relevant to the user's understanding of the relationships of the drivers to the subject metric.

Figure 15B:
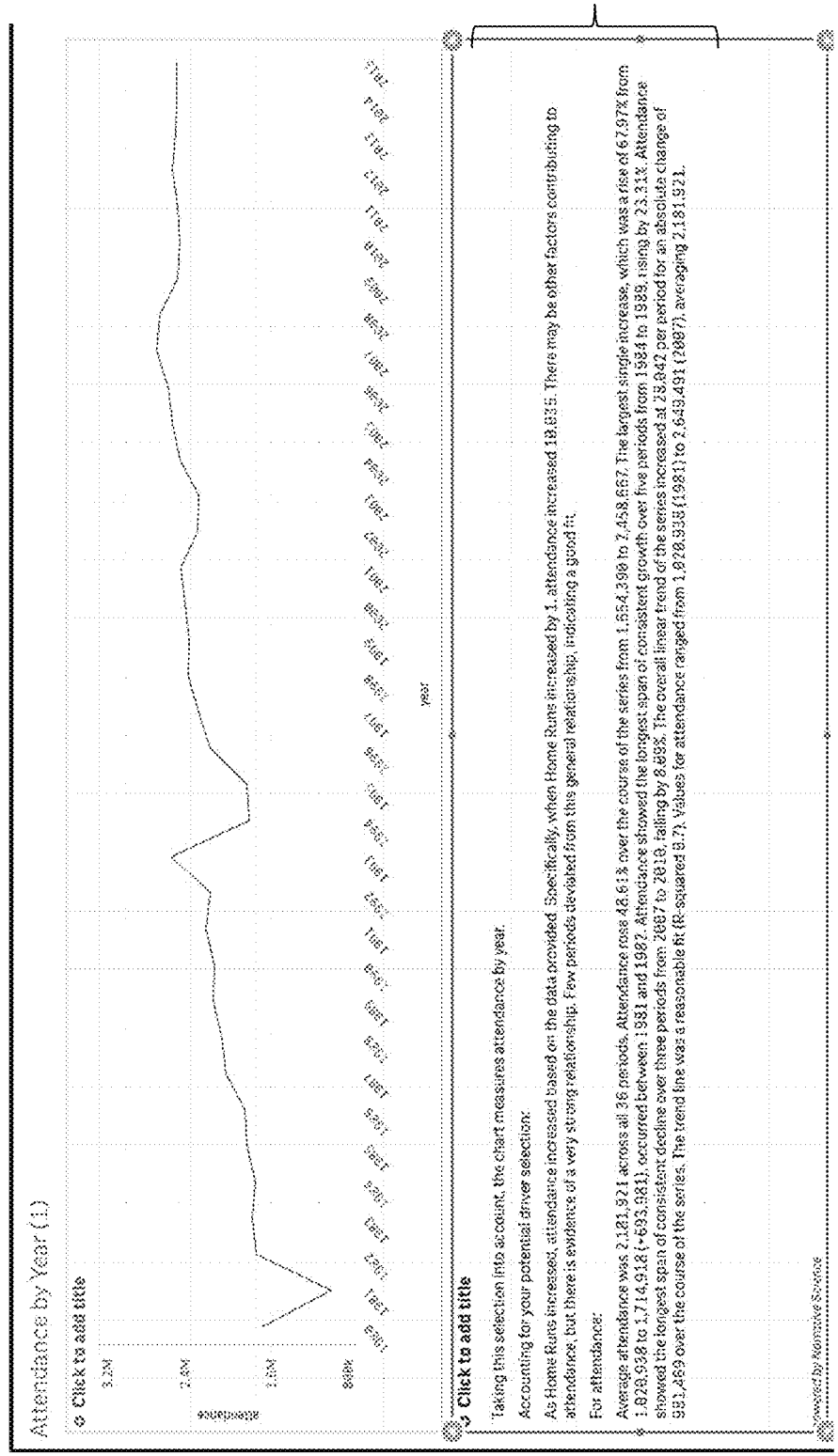
FIG. 15B depicts an example screenshot of a visualization generated from a set of visualization data that is paired with an automatically generated narrative text that explains the results of evaluating the potential driver relationship specified by FIG. 15A.

At step 1416, the processor renders narrative text based on the narrative outline using NLG techniques as described in the above-referenced and incorporated patents and patent applications. The rendered narrative text can explain the nature of the relationship between the visualization measure and the driver candidate. FIG. 15B depicts an example of such narrative text 1510 for the example case where the number of home runs is evaluated as a potential driver of average MLB attendance by season.

Figure 16B:
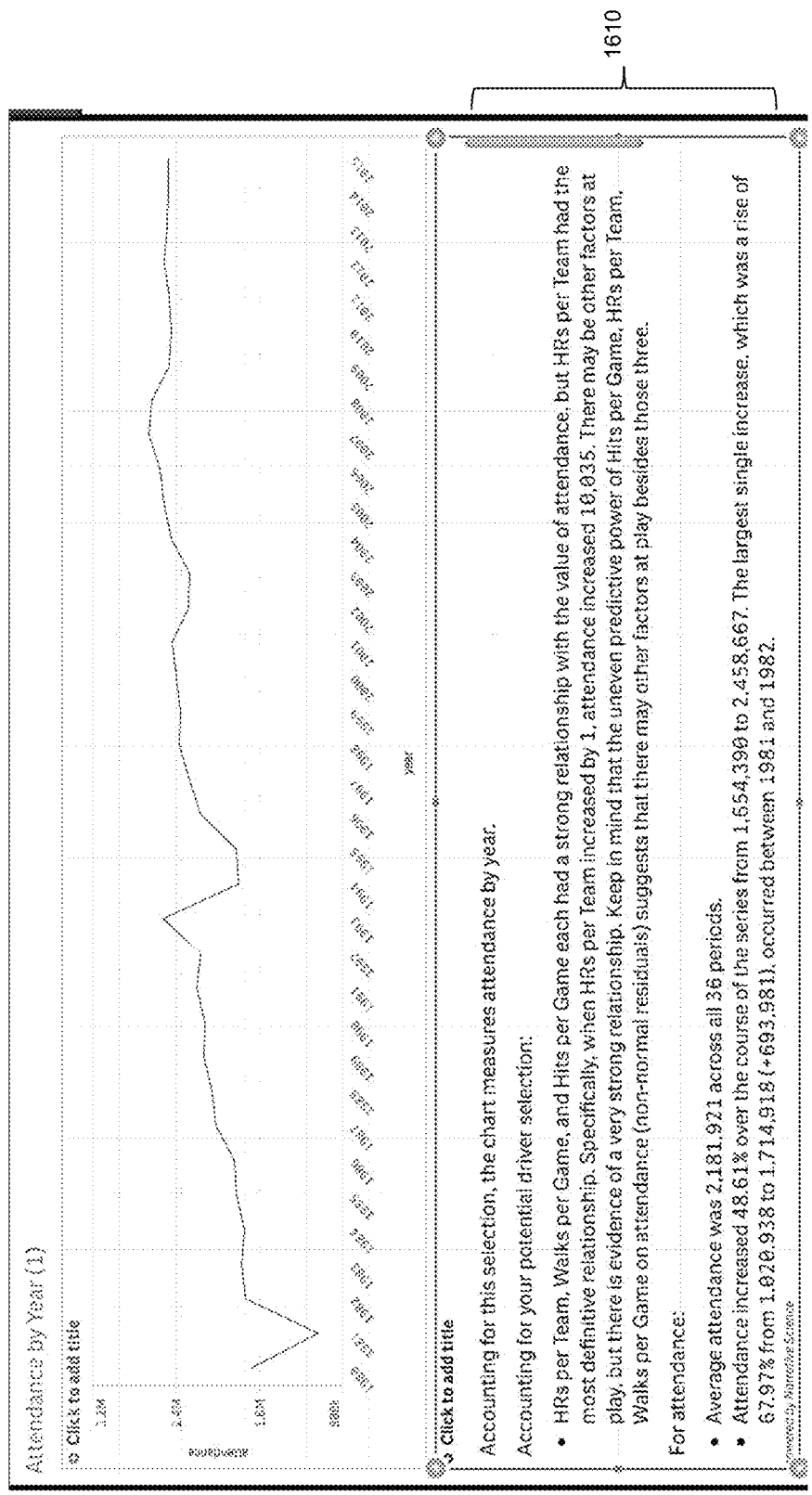
FIG. 16B depicts an example screenshot of a visualization generated from a set of visualization data that is paired with an automatically generated narrative text that explains the results of evaluating the potential driver relationships specified by FIG. 16A.

FIG. 16A depicts an example selection menu for specifying potential driver relationships where the user has provided input for evaluating multiple potential drivers relative to the visualization measure. This input may be provided via selection in a graphical user interface. It may also be provided via text or speech input in a conversational interaction. In the latter case, the potential drivers to be evaluated may be presented explicitly as shown in FIG. 16A; or they may simply be available as referents to aid in the interpretation of user queries or task commands in the context of the conversational interaction. In an example such as this, step 1408 would operate to map the specified relationships to a driver story configuration that is designed to evaluate and discuss each specified relationship. FIG. 16B shows an example narrative text 1610 that could be produced as a result of the process flow of FIG. 14 applied to the specified relationships of FIG. 16A. This narrative text 1610 represents the natural language expression of the outline discussed above in relation to the FIG. 16A example, namely a first sentence that is a summary of the driver analysis:

"HRs per Team, Walks per Game, and Hits per Game each had a strong relationship with the value of attendance . . . ."

a second section that discusses each driver candidate:

" . . . but HRs per Team had the most definitive relationship. Specifically, when HRs per Team increased by 1, attendance increased 10,035. There may be other factors at play, but there is evidence of a very strong relationship."

and a third section that presents some additional relevant information relating to the driver analysis:

"Keep in mind that the uneven predictive power of Hits per Game, HRs per Team, Walks per Game on attendance (non-normal residuals) suggests that there may other factors at play besides those three."

C(3). Interactive Analytics:

Another interactive feature of the system enables users to both enable/disable a particular analytic package from being run in the creation of a narrative as well as to customize when (and how) the results of a particular analytic are expressed in a narrative.

Figure 18:
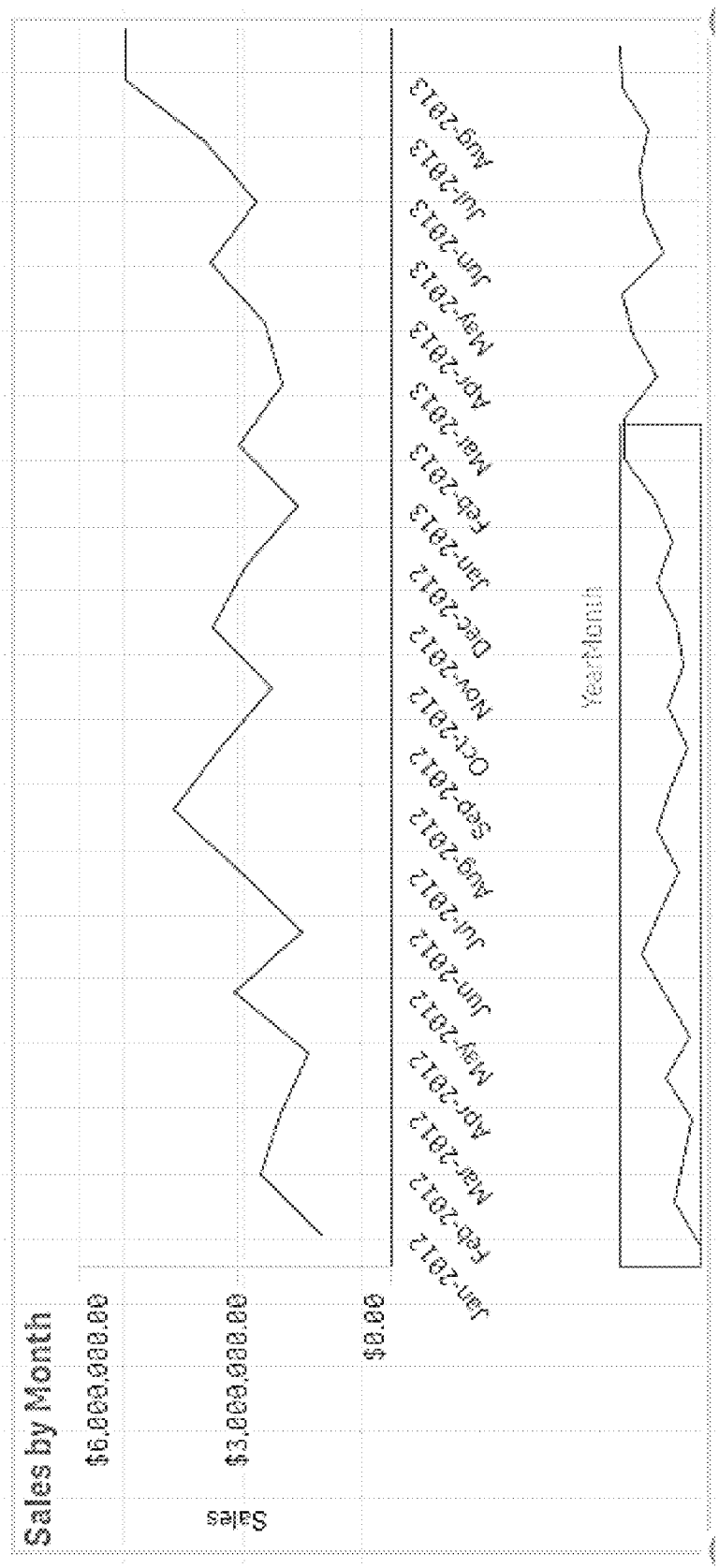

Specifically, when generating a narrative to accompany a particular visualization, or to analyze and report on data even without such visualization, the user will be presented with the available analytics potentially utilized in generating the type of story that would be appropriate to accompany that visualization. For example, when a user is generating a narrative relating to a single line chart, as shown in the FIG. 18, he or she can be presented with the available analytics for the story type relevant to such a chart.

In this example, this story type will have the analytic packages shown by FIG. 19 available. "Segments" in FIG. 19 refers to analytics that would be used to generate content about interesting parts of a time series (e.g., peaks, jumps, troughs). The narrative will utilize these analytics by default. For example, the narrative can include content about the longest segment of a continuing trend (see FIG. 20).

When the data payload is sent to the narrative API it contains information about whether or not to utilize this analytic. In this case, it is 'enabled' (see FIG. 21 showing an example portion of a data payload structure).

However, a user could choose to 'disable' any of these analytic packages. The example of FIG. 22 shows a case where 'Segments' is disabled. The content shown in FIG. 20 will, therefore, not appear in the accompanying narrative. FIG. 23 shows an example narrative generated when 'Segments' is disabled. While the examples discussed below employ user input through GUIs to receive such control inputs, it should be understood that voice commands can also enable/disable these features through the conversational interface 106. In the latter case, the available analytic packages may be presented explicitly to the user as depicted in FIG. 19;

or, again, they may simply be available as referents for use in interpreting user speech or text inputs in the context of the conversational interaction.

C(3)(1). Additional Analytics Configurations—Inclusion Thresholds:

In addition to enabling/disabling a particular analytic, a user can control the conditions under which the results of that analytic will be examined and conveyed in the accompanying narrative. Here an example is presented of what a user sees when he or she digs into a particular analytic (segment analytics, as described above) in order to achieve this level of control.

Figure 24:
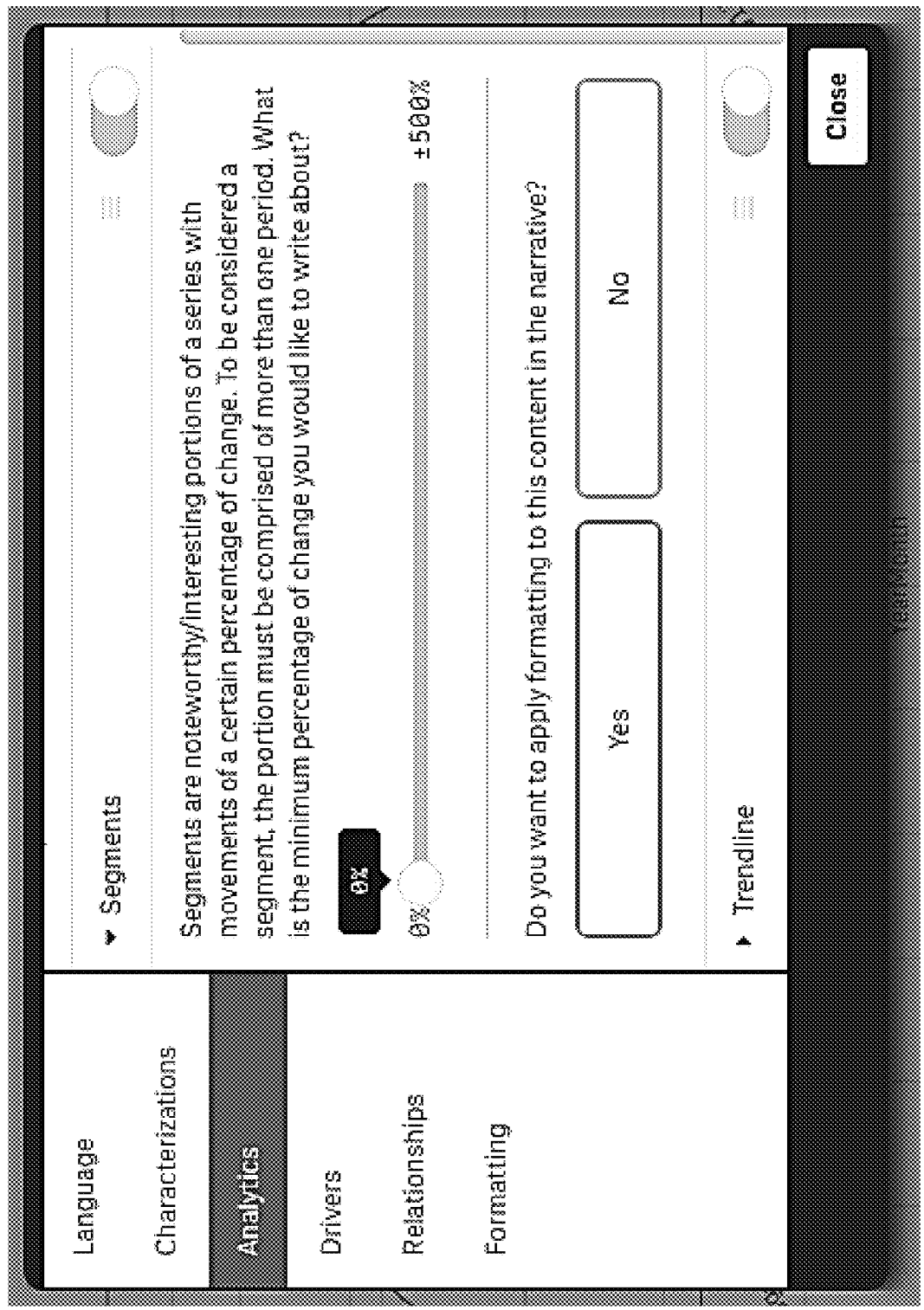

Specifically, the user can apply a 'threshold' that must be met in order for the results of segment analytics to be discussed in the story. This is a percent change that must be met for the corresponding content to appear in the narrative, controlled by the user in this case via a slider (although any appropriate interface mechanism might be used), as illustrated in FIG. 24. The user may also specify this threshold via speech or text input in a conversational interaction.

In this (perhaps somewhat extreme) example, the user has indicated (as illustrated in FIG. 25) that he or she does not want content about segment analytics to appear in the resulting narrative unless the percent change is higher than 200%. When a user applies this sort of customization, the data payload sent to the narrative API would contain information about this threshold (see FIG. 26 showing an example portion of such a data payload structure where the 'inclusion threshold' is set to '2' (i.e., 200%)).

The narrative generation platform 102 will then use this information to determine whether or not to discuss the results of a particular analytic in the narrative. For example, a narrative generation platform 102 can employ a 'derivation' that determines whether a particular segment meets the specified criteria (see FIG. 27).

This derivation is used by the system in assessing the most interesting segment of a common trend in order to determine whether it's overall percent change meets the threshold of 200%. In this case, it does not. Therefore, content discussing the results of this analytic will not be included in the narrative.

Figure 28:
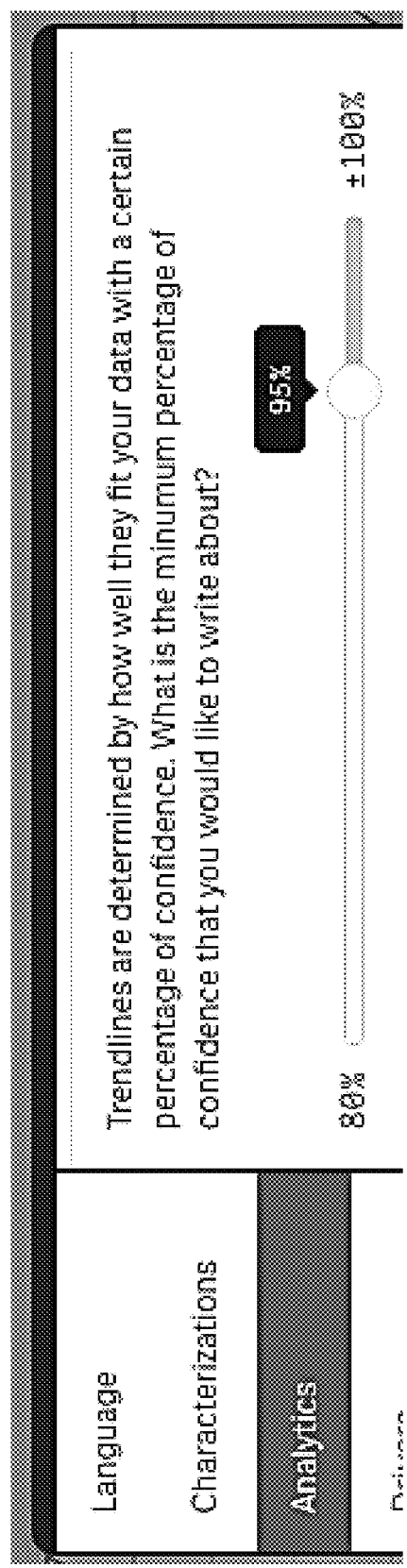

C(3)(ii). Additional Analytics Configurations—Predictive Analytics:

Continuing with the original example, another set of analytics potentially relevant in narratives appropriate for continuous data, e.g., time series, as typically conveyed in line charts, concerns trend lines. For this "Trend line" analytic, a user can similarly set a threshold to be applied based on the confidence level of the actual trend line as supported by the data. For example, if a general trend can only be identified at the 85% confidence interval, it will not be discussed in the narrative if the inclusion threshold is set at 95%. That is, the general trend must be identified at least a confidence interval of 95% to be included. A user would set this threshold as illustrated in FIG. 28:

Also pertaining to the results of the "Trend Line" analytic, a user can choose to have the narrative include content about the predicted future movement of the data series (assuming the data fit a statistically significant trend line), as well as specifying how far forward to issue a prediction (see FIG. 29). When a user supplies this configuration, the payload sent to the narrative API when invoking the system to generate a narrative includes this information as well (see FIG. 30 showing an example portion of such a data payload structure). With this information included, the narrative system is directed to include content about the prediction; after all calculations have been carried out, the resulting statistical information about the prediction is included in the data and utilized in generating the resulting narrative as illustrated by FIG. 31. The user may, again, supply this configuration via a graphical user interface, or via speech or text input of a query or task command that provides the appropriate parameterization.

C(3)(iii). Additional Analytics Configurations—Formatting:

In addition to supplying thresholds for the inclusion of content in a narrative, a user can also set thresholds for applying appropriate formatting to portions of the narrative. For example, with appropriate thresholds set, a narrative could be generated to appear as shown in FIG. 32.

Figure 33:
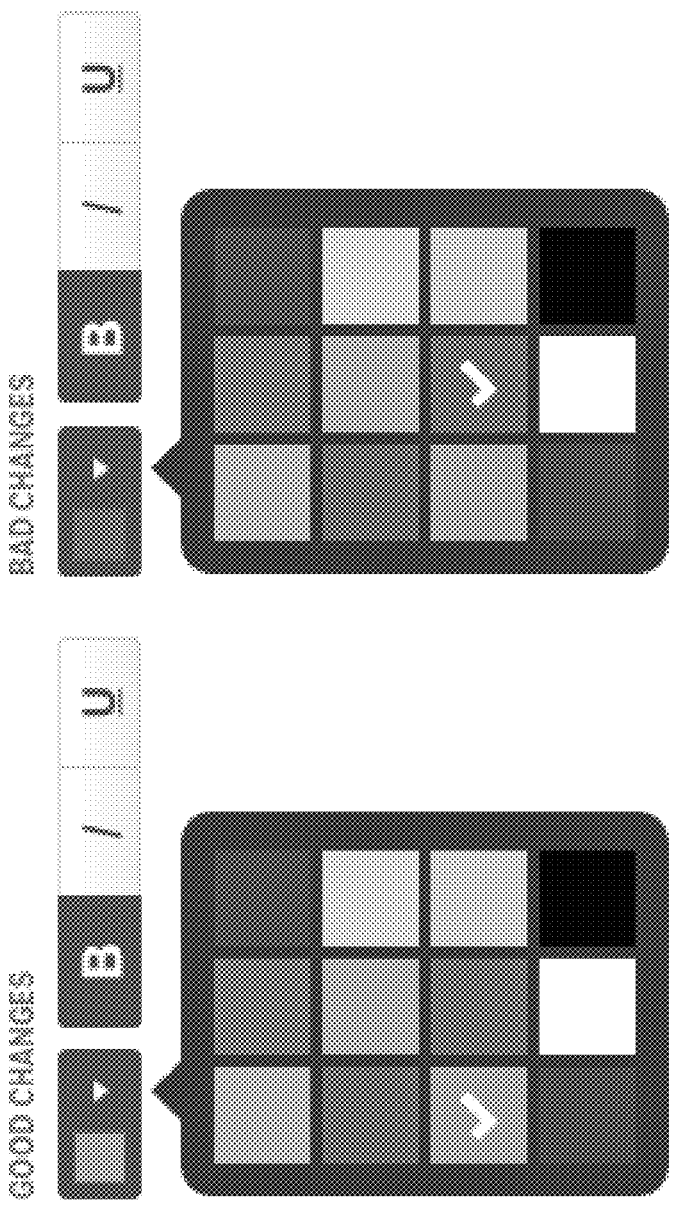

As can be seen, in this narrative the text describing positive changes is highlighted in green, while the text describing negative changes is highlighted in red. In order to achieve this effect, a user first applies the formatting rules for 'good changes' and 'bad changes'. These choices are then used when generating the narrative once a user chooses to enable formatting, as illustrated in FIG. 33.

Figures 34, 35:
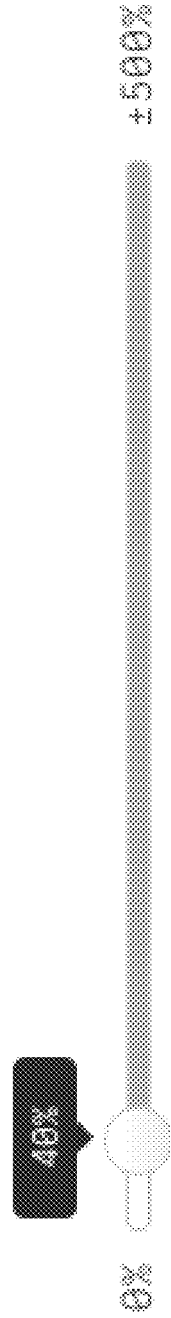

When a user is customizing his or her analytics, he or she can choose to apply this sort of formatting to the content, and then set the percentage change that must be met in order to apply the formatting, as illustrated in FIG. 34. The user may convey his or her preferences via a graphical user interface, or, again via speech or text input in a conversational interaction.

When this configuration is supplied by a user, the data payload sent to the narrative API when invoking the narrative generation system contains the appropriate information about the user's preferences, as shown by FIG. 35.

A narrative generation platform 102 can then use this information to determine how to style content when it is rendered in HTML. For example, the derivation shown in FIG. 36 is used to determine whether certain content should be formatted in this way. If the test is true, appropriate HTML tags will be applied to this content, as shown by FIG. 37. When the HTML is outputted by our system, the front end display application knows to respect the custom tag to apply the custom formatting chosen by the user, as illustrated in the FIG. 38.

While the invention has been described above in relation to its example embodiments, various modifications may be made thereto that still fall within the invention's scope. Such modifications to the invention will be recognizable upon review of the teachings herein.

What is claimed is:

1. An apparatus comprising:
    a narrative generation artificial intelligence platform comprising (1) an interface through which the narrative generation artificial intelligence platform is configured to communicate with a natural language conversational interface, and (2) logic that the narrative generation artificial intelligence platform uses to generate natural language for narrative stories;
    wherein the natural language artificial intelligence platform is configured to receive data from the natural language conversational interface via the interface, wherein the received data is derived from a natural language input and is indicative of a communication goal with respect to a data set, and wherein the narrative generation artificial intelligence platform is further configured to interactively generate narrative stories based on the received data using the logic;
    wherein the narrative generation artificial intelligence platform is further configured to (1) determine, from the logic, a natural language expression for referring to an element in a narrative story, and (2) provide the determined natural language expression to the natural language conversational interface; and
    wherein the natural language conversational interface is configured to use the provided natural language expression as a language pattern for identifying a reference to the element in natural language input to the natural language conversational interface.

2. The apparatus of claim 1 wherein the natural language conversational interface comprises a chatbot.

3. The apparatus of claim 1 wherein the narrative generation artificial intelligence platform is further configured to (1) parameterize a narrative analytics model and a story outline in response to the received data, and (2) generate a narrative story about the data set in accordance with the communication goal based on the parameterized narrative analytics model and the story outline.

4. The apparatus of claim 3 wherein the narrative generation artificial intelligence platform further comprises a second interface configured to communicate with a visualization platform through which the narrative generation artificial intelligence platform receives visualization parameter data corresponding to a visualization produced by the visualization platform, the visualization parameter data for use with the parameterization of the narrative analytics model and story outline, and wherein the narrative story is about data included in the visualization.

5. The apparatus of claim 1 wherein the narrative generation artificial intelligence platform is further configured to (1) receive a command from the natural language conversational interface, and (2) generate a narrative story based on the received command.

6. The apparatus of claim 5 wherein the narrative generation artificial intelligence platform is further configured to generate the narrative story based on the received command in combination with visualization parameter data from a visualization platform.

7. The apparatus of claim 5 wherein the command includes a specification of an entity.

8. The apparatus of claim 7 wherein the entity comprises a specific entity identified in a natural language input to the natural language conversational interface.

9. The apparatus of claim 7 wherein the entity comprises a notional entity that is notionally identified in a natural language input to the natural language conversational interface.

10. The apparatus of claim 5 wherein the command corresponds to at least one of a focus task and/or a drill down task.

11. The apparatus of claim 1 wherein the natural language input includes a specification of a notional entity;
   wherein the narrative generation artificial intelligence platform is configured to (1) determine a specific entity to which the notional entity refers based on an analysis of the data set, and (2) determine a natural language expression for referring to the specific entity corresponding to the notional entity.

12. The apparatus of claim 11 wherein the specific entity comprises a plurality of specific entities to which the notional entity refers.

13. The apparatus of claim 11 wherein the determined natural language expression for referring to the specific entity corresponding to the notional entity serves as the determined natural language expression that is provided to the natural language conversational interface.

14. The apparatus of claim 13 wherein the natural language conversational interface is further configured to use the provided natural language expression as a language pattern for identifying a reference in natural language input to the specific entity corresponding to the notional entity.

15. The apparatus of claim 1 wherein the natural language input includes a specification of a notional entity;
   wherein the narrative generation artificial intelligence platform is configured to determine a natural language expression for referring to the notional entity.

16. The apparatus of claim 15 wherein the determined natural language expression for referring to the notional entity serves as the determined natural language expression that is provided to the natural language conversational interface.

17. The apparatus of claim 16 wherein the natural language conversational interface is further configured to use the provided natural language expression as a language pattern for identifying a reference in natural language input to the notional entity.

18. The apparatus of claim 1 wherein the element comprises an entity.

19. The apparatus of claim 18 wherein the entity comprises a notional entity.

20. The apparatus of claim 1 wherein the narrative generation artificial intelligence platform is further configured to (1) derive information from logic that the narrative generation artificial intelligence platform uses to generate natural language, wherein the derived information comprises information about a command corresponding to the natural language input, and (2) provide the derived information to the natural language conversational interface;
   wherein the natural language conversational interface is further configured define a language pattern for identifying a pattern in natural language input based on the provided information such that the identified pattern comprises the corresponding command.

21. The apparatus of claim 1 wherein the natural language input comprises speech input.

22. The apparatus of claim 1 wherein the natural language input comprises text input.

* * * * *